United States Patent
Kapke et al.

(10) Patent No.: US 11,822,604 B2
(45) Date of Patent: Nov. 21, 2023

(54) TECHNIQUES FOR FACILITATING COMMUNICATIONS BETWEEN ISOLATED PROCESSES EXECUTING WITHIN A WEB BROWSER

(71) Applicant: Apple Inc., Cupertino, CA (US)

(72) Inventors: Eric T. Kapke, San Francisco, CA (US); Brian E. Kirsch, Honolulu, HI (US); William E. Kakes, Los Gatos, CA (US); Ramiro Calvo, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 156 days.

(21) Appl. No.: 17/306,298

(22) Filed: May 3, 2021

(65) Prior Publication Data

US 2021/0256064 A1 Aug. 19, 2021

Related U.S. Application Data

(62) Division of application No. 16/136,173, filed on Sep. 19, 2018, now Pat. No. 11,132,404.
(Continued)

(51) Int. Cl.
*G06F 7/00* (2006.01)
*G06F 16/901* (2019.01)
(Continued)

(52) U.S. Cl.
CPC ............ *G06F 16/9027* (2019.01); *G06F 9/54* (2013.01); *G06F 16/951* (2019.01)

(58) Field of Classification Search
CPC ....... G06F 16/9027; G06F 16/951; G06F 9/54
(Continued)

(56) References Cited

U.S. PATENT DOCUMENTS 8,819,766 B2  8/2014  Kandasamy et al.
9,070,211 B1  6/2015  Kroeger et al.
(Continued)

FOREIGN PATENT DOCUMENTS

CN  102662775 A  9/2012
CN  103559097 A  2/2014

OTHER PUBLICATIONS

International Patent Application No. PCT/US2019/033355 International Search Report and Written Opinion dated Sep. 4, 2019.

*Primary Examiner* — Isaac M Woo
(74) *Attorney, Agent, or Firm* — Aikin & Gallant, LLP

(57) ABSTRACT

Disclosed herein is a technique for enabling isolated processes executing within a web browser to distribute information to one another. The method can be implemented by a first process executing within the web browser, and include the steps of (1) receiving, from a child process executing within the web browser, a first request to subscribe to a topic, (2) in response to identifying that the child process is not subscribed to the topic: updating a topic map to indicate that the child process is subscribed to the topic, and (3) in response to identifying that the first process is associated with the parent process: issuing, to the parent process, a second request for the first process to subscribe to the topic. Also disclosed herein is a method for enabling a first process executing within a web browser to access services provided by other processes executing within the web browser.

21 Claims, 28 Drawing Sheets

Related U.S. Application Data

(60) Provisional application No. 62/678,162, filed on May 30, 2018.

(51) Int. Cl.
*G06F 9/54* (2006.01)
*G06F 16/951* (2019.01)

(58) Field of Classification Search
USPC .................................................. 707/600–899
See application file for complete search history.

(56) References Cited

U.S. PATENT DOCUMENTS

| | | | |
|---|---|---|---|
| 9,576,301 B1 | 2/2017 | Sripracha et al. | |
| 9,967,222 B2 | 5/2018 | Feng et al. | |
| 2009/0037806 A1 | 2/2009 | Yang et al. | |
| 2009/0328063 A1 | 12/2009 | Corvera et al. | |
| 2011/0082916 A1 | 4/2011 | Swanson et al. | |
| 2012/0047517 A1 | 2/2012 | Townsend et al. | |
| 2012/0079066 A1 | 3/2012 | Li et al. | |
| 2015/0046929 A1* | 2/2015 | Kumar | G06Q 10/10 718/106 |
| 2015/0081798 A1 | 3/2015 | Lee et al. | |

\* cited by examiner

TECHNIQUES FOR FACILITATING COMMUNICATIONS BETWEEN ISOLATED PROCESSES EXECUTING WITHIN A WEB BROWSER

CROSS-REFERENCE TO RELATED APPLICATIONS

This application is a divisional of co-pending U.S. application Ser. No. 16/136,173, filed Sep. 19, 2018, which claims the benefit of U.S. Provisional Patent Application No. 62/678,162, filed on May 30, 2018, both of which are incorporated herein by reference.

FIELD

The described embodiments set forth techniques for facilitating communications between isolated processes executing within a web browser. In particular, the techniques provide a framework that enables the isolated processes to distribute information to one another in a seemingly-direct manner using indirect communication paths that are formed across the isolated processes.

BACKGROUND

Web browsers are the most popular applications for enabling users to access resources through an Internet connection. For example, a web browser can enable a user to load web pages, access web services, and so on, to enable a user to carry out useful functionalities on their computing device. In recent years, various advancements have been made to web browsers and the underlying code that they are able to interpret (e.g., hypertext markup language (HTML), JavaScript, etc.). Notably, these advancements have enabled developers to provide web-based software applications that offer the same functionalities as standalone software applications that conventionally executed on operating systems, e.g., email applications, word processing applications, spreadsheet applications, and so on. As a result, users are provided the benefit of being able to interface with these applications from any computing device that includes a web browser, thereby improving overall accessibility. Moreover, the web-based approach enables enhanced features to be implemented, such as centralized data management, improved integration with other web applications, synchronized collaboration with other users, and so on.

Despite the foregoing advancements that have been achieved, several drawbacks exist with regard to the conventional implementation of web applications. One example of a drawback involves the typical manner in which a given web application spawns child applications to provide useful functionality to a user—e.g., a web email application loading a web address book within the same browser window. One common approach for spawning child web applications includes the use of inline frames (IFrames), where each IFrame provides a sandboxed execution environment for the code that is loaded within the IFrame. In some cases, it can be desirable for the limitations of the sandboxed execution environment to remain in effect, e.g., when a given child web application is developed using similar code that might conflict with the code of its parent web application. However, it can also be desirable for the parent and child web applications to be capable of communicating with one another, which is expressly forbidden by the inherent design of IFrames. As a result, developers must resort to piecemeal approaches for enabling their web applications to communicate with one another, which contributes to unreliable performance, redundant coding, and the like. This problem is exacerbated under scenarios where complex hierarchical relationships exist across web applications, e.g., when child applications themselves spawn their own child applications, and so on.

Accordingly, what is needed is an improved technique for enabling isolated web applications executing within a web browser to communicate with one another in an organized and seamless manner.

SUMMARY

The described embodiments set forth techniques for enabling isolated processes executing within a web browser to communicate with one another. In particular, the techniques provide a framework that enables the isolated processes to distribute information to one another in a seemingly-direct manner using indirect communication paths that are formed across the isolated processes.

One embodiment sets forth a method for enabling isolated processes executing within a web browser to distribute information to one another. According to some embodiments, the method can be implemented by a first process executing within the web browser, and include the steps of (1) receiving, from a child process executing within the web browser, a first request to subscribe to a topic, (2) in response to identifying, based on a topic map associated with the first process, that the child process is not subscribed to the topic: updating the topic map to indicate that the child process is subscribed to the topic, and (3) in response to identifying that the first process is associated with the parent process: issuing, to the parent process, a second request for the first process to subscribe to the topic. In turn, the parent process can also carry out the same foregoing steps, such that a logical path is formed that enables the child process to receive publications associated with the topic regardless of which process within the browser issues the publications. Accordingly, the method can further include the steps of (4) receiving, from a process executing within the web browser, a third request to publish content in association with the topic, (5) referencing the topic map to identify that (i) the child process, and (ii) possible other child processes of the first process, are subscribed to the topic, and (6) issuing, to each of the child process and possible other child processes, respective requests to publish the content in association with the topic.

Also disclosed herein is a method for enabling a first process executing within a web browser to access services provided by other processes executing within the web browser. According to some embodiments, the method can include the steps of (1) receiving, from a child process, a request to register a service, (2) updating a service map associated with the first process to reflect that the service is accessible via the child process, and (3) in response to determining that the first process is associated with the parent process: issuing, to the parent process, a second request to register the service. After the service is registered, different processes can issue requests to connect to the service. According to some embodiments, this can involve the steps of (4) receiving, from a process, a connection request directed to the service, (5) identifying, based on the service map, that the service is accessible via the child process, and (6) forwarding the connection request to the child process, where the child process directly or indirectly provides the connection request to the service. Additionally, the connection request can be followed-up by a connection acknowledgement to inform the process that the connection request was successful. According to some embodiments, this can involve the steps of (7) receiving, from the child process, a connection acknowledgement that corresponds to the connection request, and (8) forwarding the connection acknowledgement to the process. In turn, messages can be communicated between the process and the service, by carrying out the steps of (9) receiving, from the process, a message addressed to the service, and (10) forwarding the message to the child process, where the child process directly or indirectly provides the message to the service.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 3A-3J set forth conceptual diagrams that illustrate how various processes can distribute information according to a publication/subscription approach, according to some embodiments.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for enabling isolated processes executing within a web browser to communicate with one another. In particular, the techniques provide a framework that enables the isolated processes to distribute information to one another in a seemingly-direct manner using indirect communication paths that are formed across the isolated processes. A more detailed discussion of these techniques is set forth below and described in conjunction with the various accompanying FIGS., which illustrate detailed diagrams of systems and methods that can be used to implement these techniques.

Figure 1A:
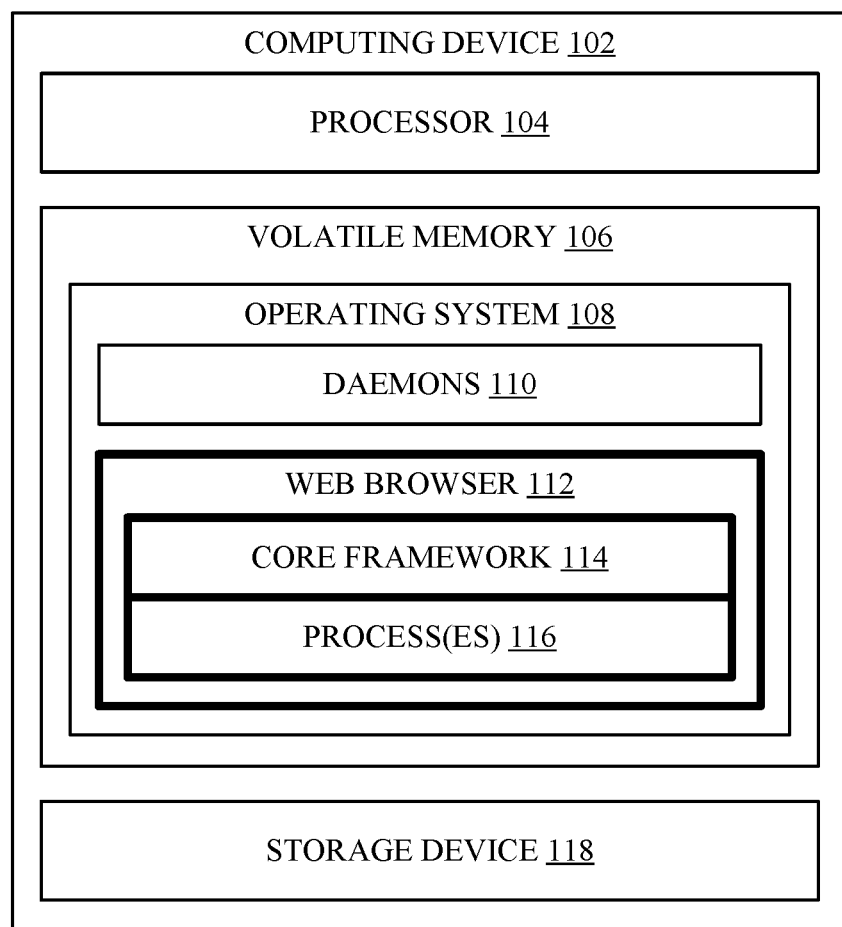
FIGS. 1A-1B illustrate block diagrams of different components of a system that can be configured to implement the various techniques described herein, according to some embodiments.

FIG. 1A illustrates a block diagram 100 of a computing device 102—e.g., a smart phone, a tablet, a laptop, a desktop, a server, etc.—that can be configured to implement the various techniques described herein. It should be understood that the various hardware components of the computing device 102 illustrated in FIG. 1A are presented at a high level in the interest of simplification, and that a more detailed breakdown is provided below in conjunction with FIG. 7. It should also be understood that the computing device 102 can include additional entities that enable the implementation of the various techniques described herein without departing from the scope of this disclosure. Is should additionally be understood that the entities described herein can be combined or split into additional entities without departing from the scope of this disclosure. It should further be understood that the various entities described herein can be implemented using software-based or hardware-based approaches without departing from the scope of this disclosure.

As shown in FIG. 1A, the computing device 102 can include a processor 104 that, in conjunction with a volatile memory 106 (e.g., a dynamic random-access memory (DRAM)) and a storage device 118 (e.g., a hard drive, a solid-state drive (SSD), etc.), enables different software entities to execute on the computing device 102. For example, the processor 104 can be configured to load, into the volatile memory 106, various components for an operating system (OS) 108 that are stored in a non-volatile memory of the storage device 118. In turn, the operating system 108 can enable the computing device 102 to provide a variety of useful functions, e.g., loading/executing various software entities. Such entities can include, for example, daemons 110 (e.g., components of the OS 108). Additionally, the entities can include user applications, e.g., a web browser 112 configured to enable a user of the computing device 102 to access web pages/services via the Internet.

As shown in FIG. 1A, the web browser 112 can be configured to load and execute a core framework 114 that enables the techniques set forth herein to be implemented. According to some embodiments, the core framework 114 can represent an application programming interface (API) through which various functions can be called by processes 116 that execute within the web browser 112. According to some embodiments, each process 116 can execute within a respective sandboxed environment implemented by the web browser 112. For example, a process 116-1 can execute within a first inline frame (IFrame) implemented by the web browser 112, and a process 116-2 can execute within a second IFrame implemented by the web browser 112. In this example, each IFrame provides a separate and distinct execution environment that largely forbids the processes 116-1 and 116-2 from interacting with one another.

Notably, the isolated execution environments provided by IFrames can be useful when the processes 116-1 and 116-2 implement similar code that might otherwise cause ambiguity/conflicts if they were to execute under the same execution environment. However, as previously described herein, such limitations can negatively impact scenarios in which it is beneficial for the process 116-1 and the process 116-2 to communicate with one another. Accordingly, and as described in greater detail herein, the core framework 114 can be utilized by the processes 116-1 and 116-2 to enable them to communicate with one another without violating the existing rules that are enforced by IFrames. It is noted that the discussion of IFrames throughout this disclosure is merely exemplary, and that any approach for isolating processes within the web browser 112 can be utilized without departing from the scope of this disclosure.

Accordingly, FIG. 1A provides an overview of the manner in which the computing device 102 can be configured to implement the techniques described herein, according to some embodiments. A more detailed breakdown of the manner in which the processes 116 can be configured to communicate with one another is provided below in conjunction with the conceptual diagram 150 illustrated in FIG. 1B.

Figure 1B:
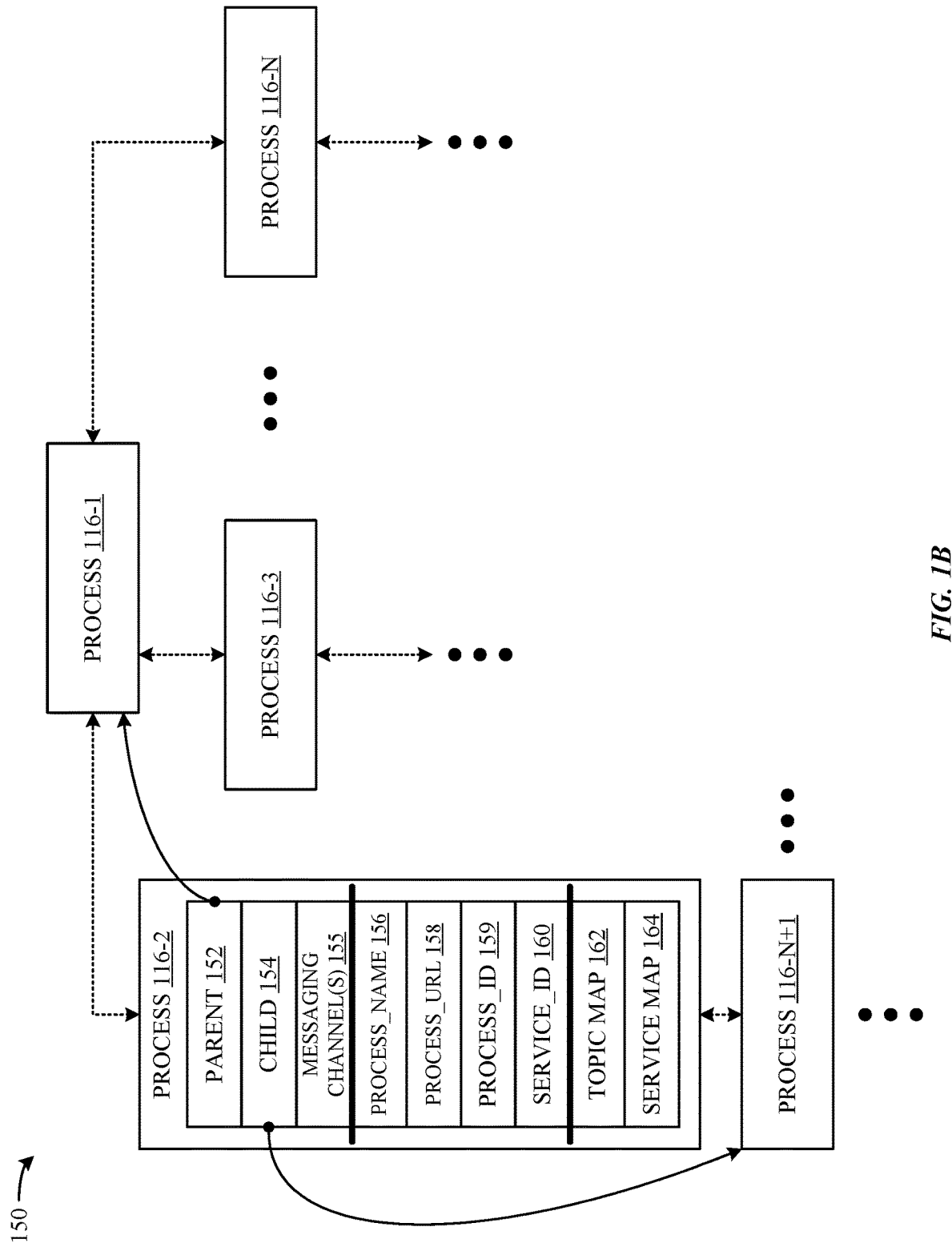

As shown in FIG. 1B, a hierarchy can be formed as different processes 116 spawn child process 116, as those child processes spawn child processes 116, and so on. For example, a root process 116-1 can spawn child processes 116-1 through 116-N. Moreover, each of the child processes 116-1 through 116-N can spawn their own child processes 116—e.g., the child process 116-(N+1)—and so on. According to some embodiments, and as described in greater detail herein, each process 116 can utilize the core framework 114 to be assigned various properties that enable the process 116 to communicate, in a seemingly-direct manner, with other processes 116, regardless of their position within the hierarchy. The core framework 114 also enables the processes 116 to take on values that enable them to be identifiable within the hierarchy so that they can distribute information to one another and access services provided by one another.

According to some embodiments, and to maintain an overall organization of the hierarchy, each process 116 can include a parent reference 152 and a child reference 154. As shown in FIG. 1B, the parent reference 152 and the child reference 154 for a given process 116 respectively refer to the parent/child processes 116—if any—that are associated with the process 116. Additionally, and as described in greater detail below in conjunction with FIG. 2, each process 116 can be configured to establish/maintain a messaging channel 155 with its parent process 116 (if any) and its child process(es) 116 (if any) spawned by the process 116. In this manner, the processes 116 can be capable of communicating with one another through either a direct path—e.g., a parent process 116 communicating with a child process 116—or through two or more indirect paths—e.g., a grandparent process 116 communicating with a grandchild process 116 by way of a parent process 116.

Additionally, as shown in FIG. 1B, each process 116 can include a process name 156 that describes the process 116, e.g., "com.domain.address_book". Each process 116 can also include a process uniform resource locator (URL) 158 that describes a URL through which the process 116 can be accessed, e.g., "https://domain.com/address_book". Each process 116 can also include a process ID 159 that uniquely identifies the process 116 relative to the other processes 116 that exist within the hierarchy, especially when there are processes 116 that share the same process name 156/process URL 158. In this regard, the process ID 159 for a given process 116 can enable other processes 116 to uniquely address the process 116 when performing the various functionalities set forth herein. Additionally, each process 116 can include a service ID 160 that describes a name of a service—e.g., "com.domain.addressbook-service"—that is implemented by the process 116. It is noted that each process 116 is not limited to only implementing a single service. On the contrary, each process 116 can implement various services, as well as maintain various service IDs 160 that correspond to the services, without departing from the scope of this disclosure.

Additionally, as shown in FIG. 1B, each process 116 can be configured to maintain a topic map 162. According to some embodiments, the topic map 162 for a given process 116 can include an entry for every child process 116 (of the process 116) that has issued a request to subscribe to a particular topic. In this regard, the process 116 can effectively (i) receive a publication of content associated with the topic, (ii) identify child processes 116—if any—that are subscribed to the topic, and (iii) distribute the content to the identified child processes 116. Additionally, the topic map 162 for a given process 116 can include an entry for each topic to which the process 116 itself is subscribed. In this regard, the process 116 can effectively identify that an appropriate action should be taken when published content is received by the process 116 and is associated with a particular topic to which the process 116 is subscribed. A more detailed breakdown of the manner in which the processes 116 can communicate with one another according to a publication/subscription approach is provided below in conjunction with FIGS. 3A-3J.

Additionally, as shown in FIG. 1B, each process 116 can be configured to maintain a service map 164. According to some embodiments, the service map 164 for a given process 116 can include an entry for every child process 116 (of the process 116) that has issued a request to the process 116 to access a service that is provided by a different process 116 or the process 116 itself. In this regard, the process 116 can remain capable of forwarding service-related messages to the appropriate processes 116 so that the services can be effectively implemented between the processes 116 that form a given hierarchy. A more detailed breakdown of the manner in which processes 116 can both implement and access various services is provided below in conjunction with FIGS. 4A-4G.

Accordingly, FIG. 1B illustrates how each process 116 can maintain various properties to enable the described embodiments to be implemented. As previously set forth herein, each process 116 can be configured to establish a messaging channel 155 with each child process 116 that is spawned by the process 116. According to some embodiments, the messaging channel 155 between two processes 116 can be implemented using any approach that enables the two processes 116 to effectively communicate information between one another through the transmission of messages. According to some embodiments, the core framework 114 can utilize the "POST" requests supported by the hypertext transfer protocol (HTTP), and add layers of abstraction on top of the POST requests so that they take the form of messages that provide enhanced functionalities that are not normally available using traditional POST requests. For example, JavaScript Object Notation (JSON)/Remote Procedure Calls (RPCs) can be utilized to attach additional properties/handling mechanisms to POST requests such that they take the form of messages that can be relied upon and enumerated by the processes 116. In this manner, the messaging channels 155—as well as the messages that are transmitted over the messaging channels 155—can provide a more reliable technique for transmitting information between the processes 116. It is noted that the messages described herein do not rely on POST requests to be implemented. On the contrary, the messages described herein can be implemented through the utilization of any technique that effectively enables information to be transmitted between the processes 116, without departing from the scope of this disclosure.

Figure 2:
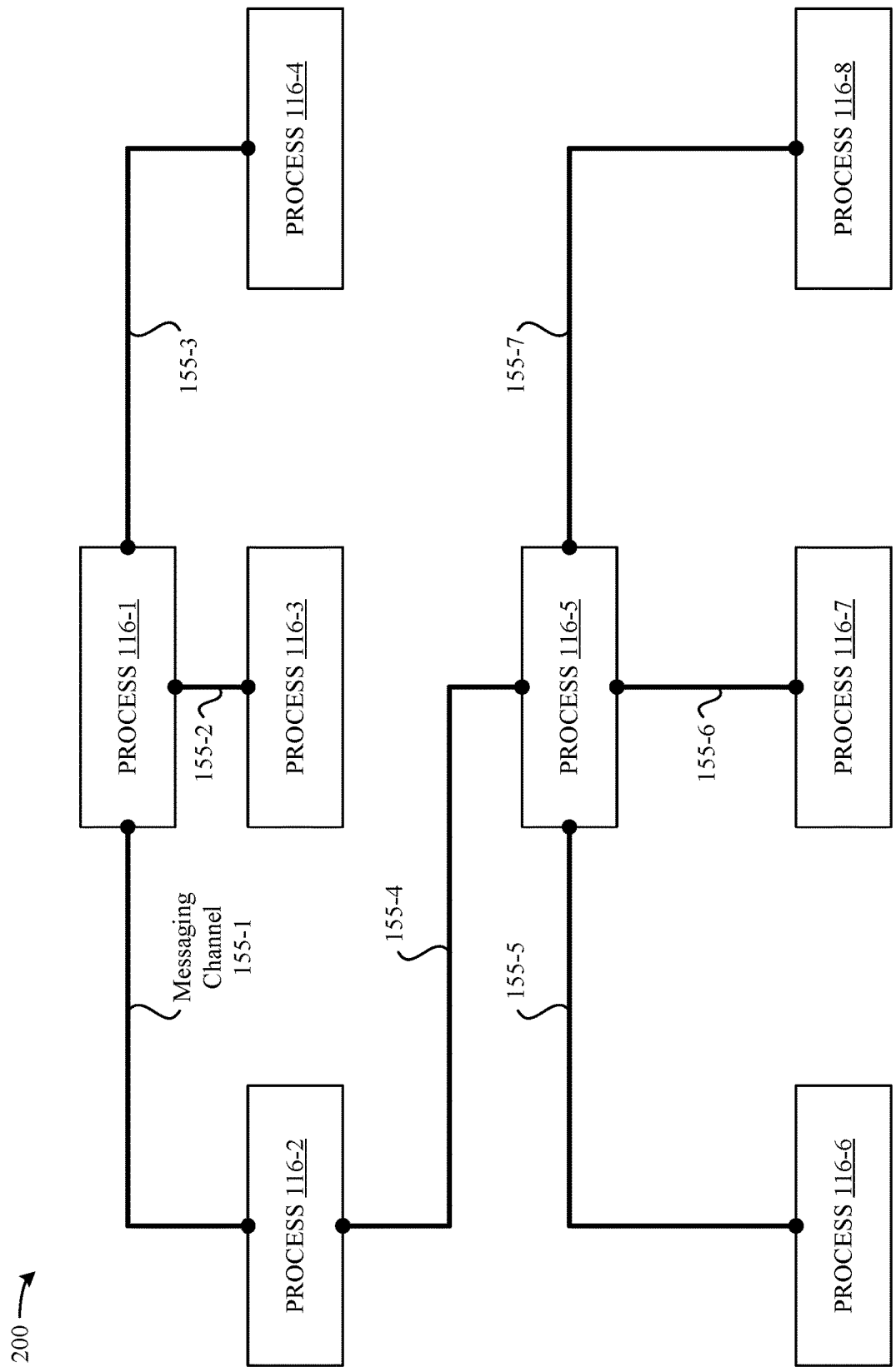
FIG. 2 sets forth a conceptual diagram that includes various processes that are members of a hierarchy, and that are capable of communicating with one another by way of different messaging channels, according to some embodiments.

FIG. 2 sets forth a conceptual diagram 200 that includes various processes 116 that are members of a hierarchy, and that are capable of communicating with one another by way of different messaging channels 155, according to some embodiments. In particular, the hierarchy illustrated in FIG. 2 can be formed by the process 116-1 spawning the child processes 116-1, 116-2 and 116-3, which are communicably linked to the process 116-1 by way of the messaging channels 155-1, 155-2, and 115-3, respectively. Additionally, and as shown in FIG. 2, the process 116-2 can spawn a child process 116-5, where they are communicably linked by way of the messaging channel 155-4. Moreover, the process 116-5 can spawn the child processes 116-6, 116-7, and 116-8, which are communicably linked to the process 116-5 by way of the messaging channels 155-5, 115-6, and 155-7, respectively. Further, and as shown in FIG. 2, the processes 116-3 and 116-4 do not spawn child processes, such that they are positioned as leaf processes within the hierarchy. Accordingly, the various messaging channels 155 illustrated in FIG. 2 enable each process 116 to communicate with any other process 116 by way of direct or indirect messaging channels 155. For example, the process 116-1 can communicate with the process 116-7 by way of the messaging channels 155-1, 155-4, and 155-6 that interconnect the processes 116-1, 116-2, and 116-5, and 116-7 together.

Figure 3A:
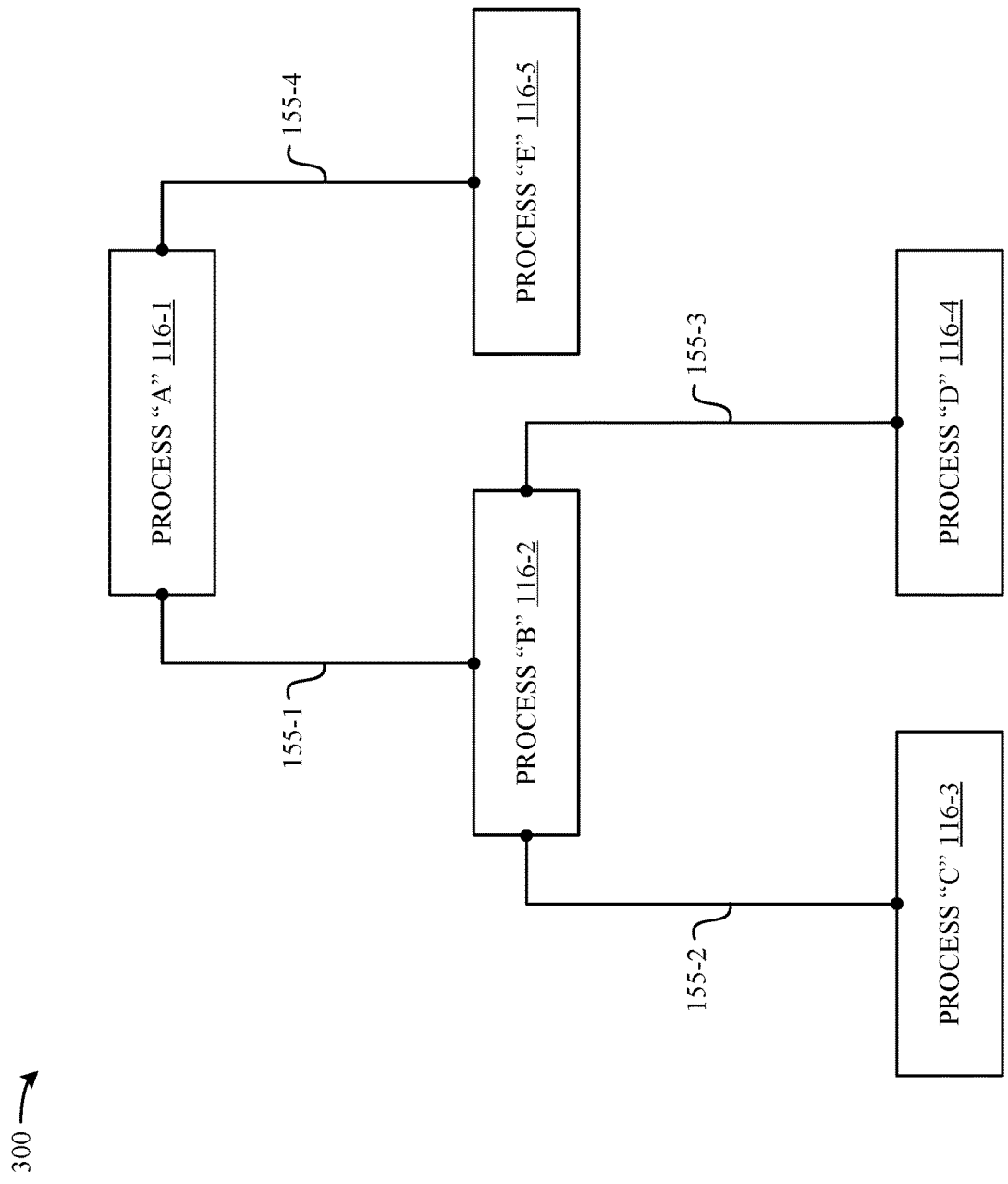

Accordingly, the conceptual diagram 200 of FIG. 2 illustrates how various processes 116 can communicate with one another by way of the different messaging channels 155 that are formed between them. In this regard, it can be useful for the core framework 114 to enable the processes 116 to distribute information to one another and access services provided by one another in an organized manner. As previously described herein, one approach for distributing information can be implemented according to a publication/subscription approach, the details of which will now be described in conjunction with FIGS. 3A-3H. As shown in FIG. 3A, a conceptual diagram 300 involves five different processes 116-1 through 116-5 that are arranged into an example hierarchy and are communicably linked by way of the messaging channels 155-1 through 155-4. In the interest of clarifying the illustrations throughout FIG. 3A-3H, each of the processes 116-1 through 116-5 are assigned a respective process name 156, e.g., "A" for the process 116-1, "B" for the process 116-2, "C" for the process 116-3, "D" for the process 116-4, and "E" for the process 116-5. Accordingly, FIG. 3A illustrates an initial state of the hierarchy formed across the processes 116-1 through 116-5, where no subscriptions or publications associated with topics have been established.

Figure 3B:
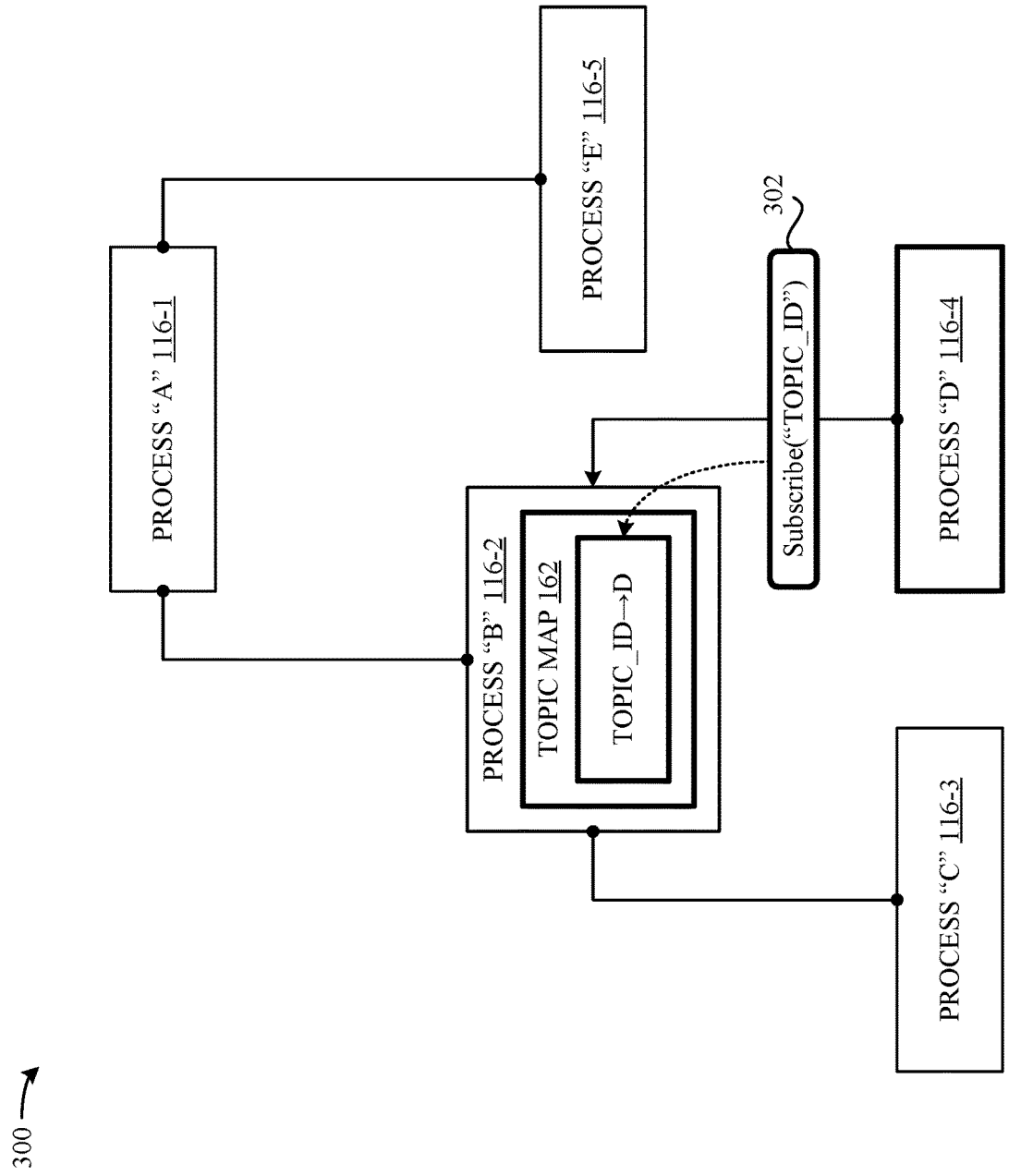

FIG. 3B extends the conceptual diagram 300, and illustrates what can occur when the process 116-4 issues a message 302 to subscribe to the topic "TOPIC_ID". According to some embodiments, the topic can take any form, e.g., alphanumeric text, that enables the topic to be uniquely identified within the hierarchy. As shown in FIG. 3B, the process 116-4 can transmit the message 302 to the process 116-2 by way of the messaging channel 155 that is formed between them. In turn, the process 116-2 can update its topic map 162 to include an entry that associates the topic "TOPIC_ID" with the process 116-4. It is noted that the directionality of the association between the topic "TOPIC_ID" and the process 116-4 is not required, and that any approach for maintaining the association can be implemented without departing from the scope of this disclosure. In turn, when the process 116-2 receives a publication request associated with the topic "TOPIC_ID"—e.g., from either the process 116-1 or process 116-3—the process 116-2 will know to forward the publication request to the process 116-4. Notably, it can be useful for the process 116-2 to forward the message 302 upward within the hierarchy—i.e., to the parent process 116-1—to reduce the overall number of communications that would otherwise take place using approaches that blindly forward all publication requests to all processes 116.

Figure 3C:
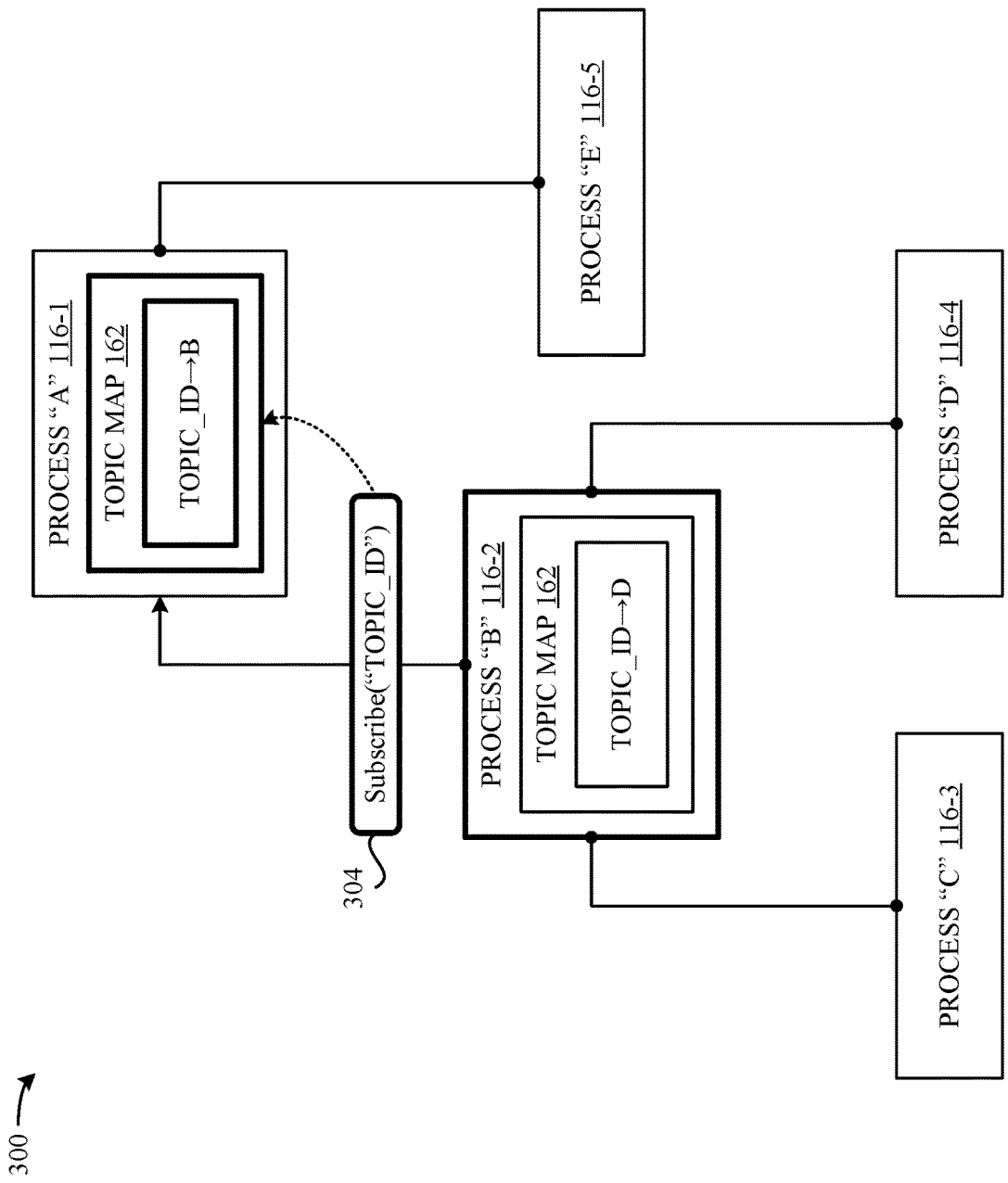

Accordingly, FIG. 3C extends the conceptual diagram 300, and illustrates what can occur when the process 116-2 issues a message 304 to subscribe to the topic "TOPIC_ID". In turn, the process 116-1 can update its topic map 162 to include an entry that associates the topic "TOPIC_ID" with the process 116-2. Accordingly, any publication request that (i) is associated with the topic "TOPIC_ID", and (ii) is directed to the process 116-1 or the process 116-2, will effectively reach the process 116-4.

Figure 3D:
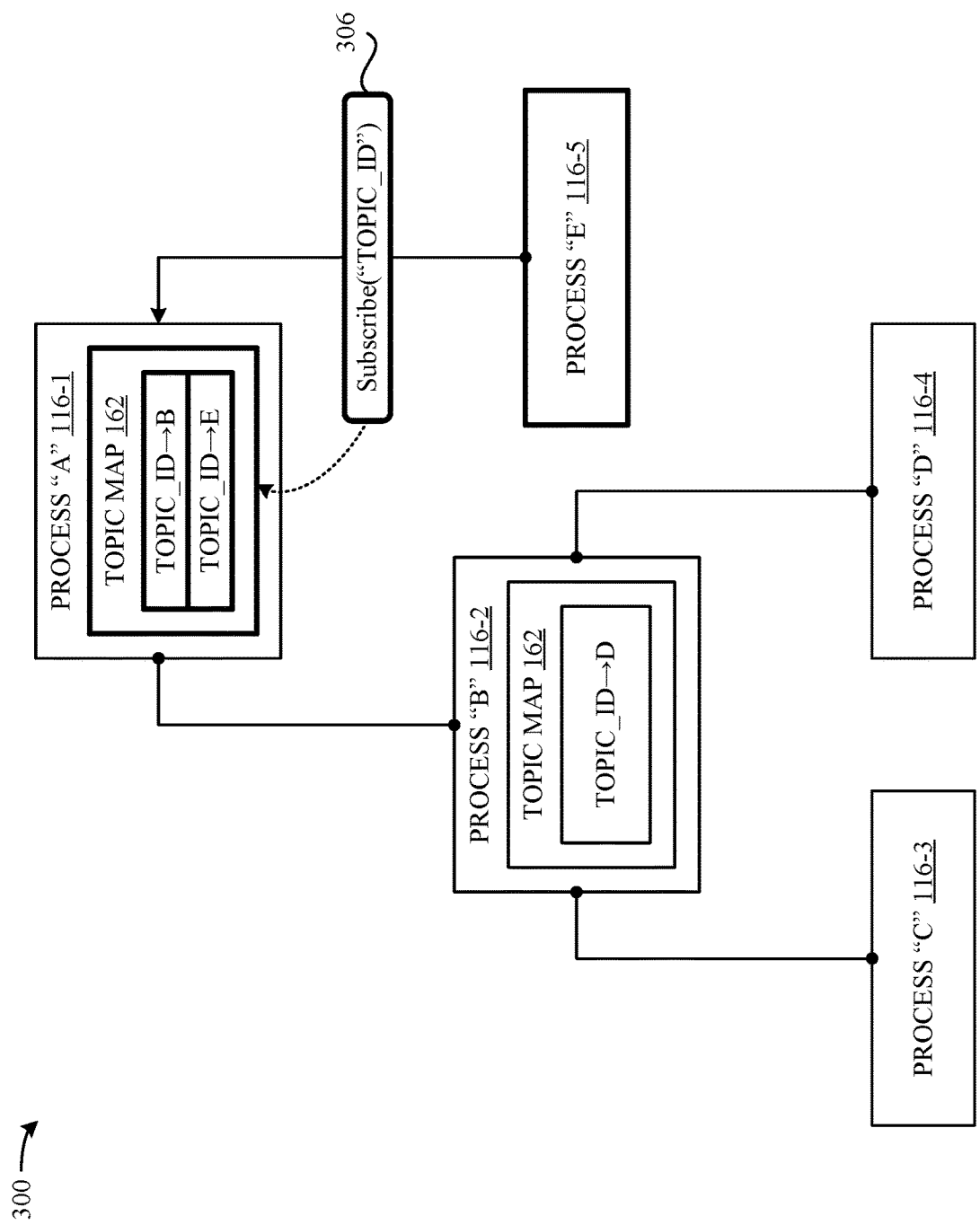

FIG. 3D extends the conceptual diagram 300, and illustrates what can occur when the process 116-5 issues a message 306 to subscribe to the topic "TOPIC_ID". In turn, the process 116-1 can update its topic map 162 to include a second entry that associates the topic "TOPIC_ID" with the process 116-5. It is noted that any approach can be utilized to improve the overall efficiency of the manner in which the entries within the topic map 162 are organized. For example, instead of adding a second entry that refers to the same topic, a single entry can exist for each topic, where the topic is associated with one or more processes 116 that are subscribed to the topic. Accordingly, any publication request that (i) is associated with the topic "TOPIC_ID", and (ii) is directed to the process 116-1 or the process 116-2, will effectively reach the process 116-4 and 116-5.

Figure 3E:
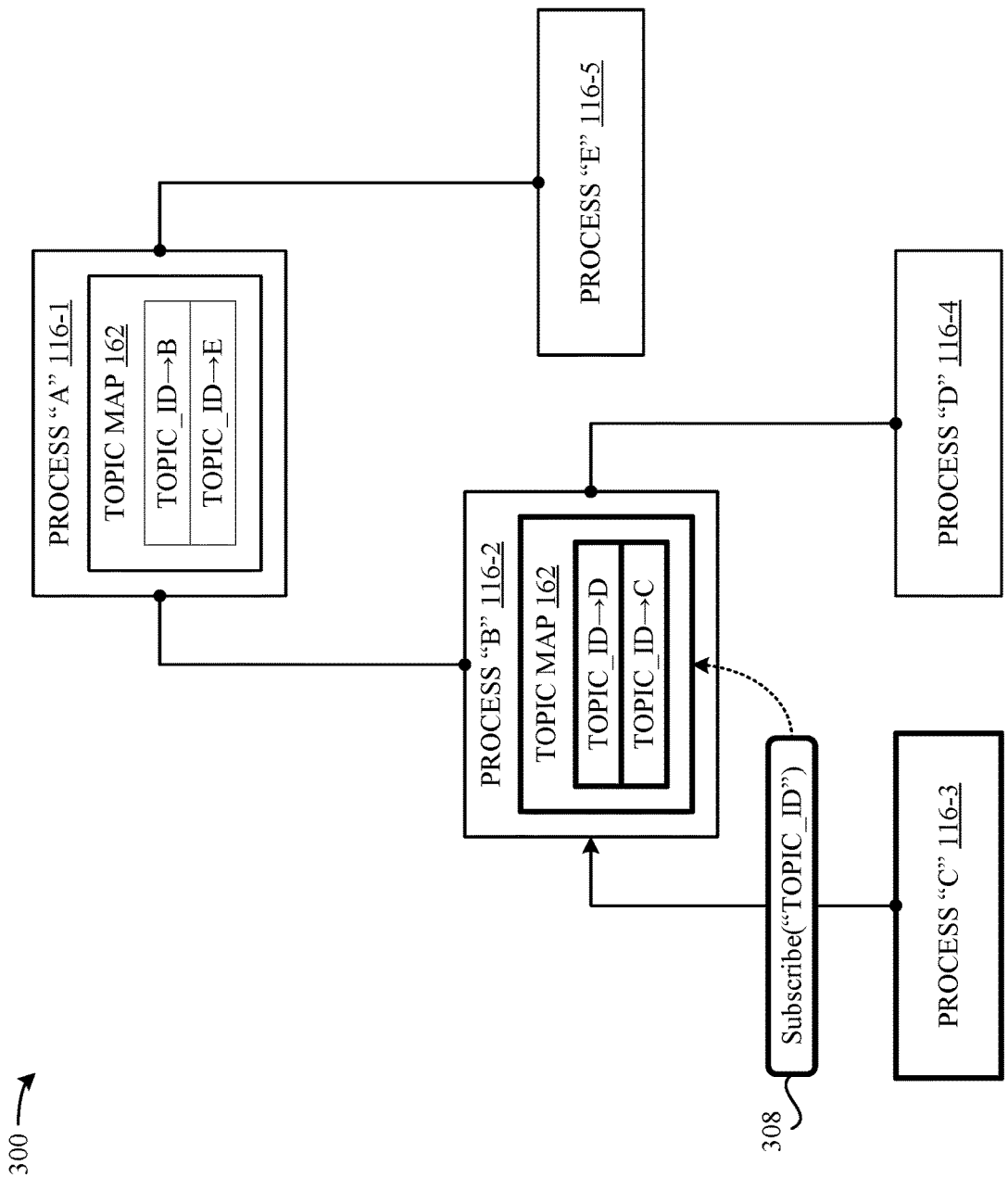

FIG. 3E extends the conceptual diagram 300, and illustrates what can occur when the process 116-3 issues a message 308 to subscribe to the topic "TOPIC_ID". In turn, the process 116-2 can update its topic map 162 to include a second entry that associates the topic "TOPIC_ID" with the process 116-3. Accordingly, any publication request that (i) is associated with the topic "TOPIC_ID", and (ii) is directed to the process 116-1 or the process 116-2, will effectively reach the processes 116-3, 116-4, and 116-5.

Figure 3F:
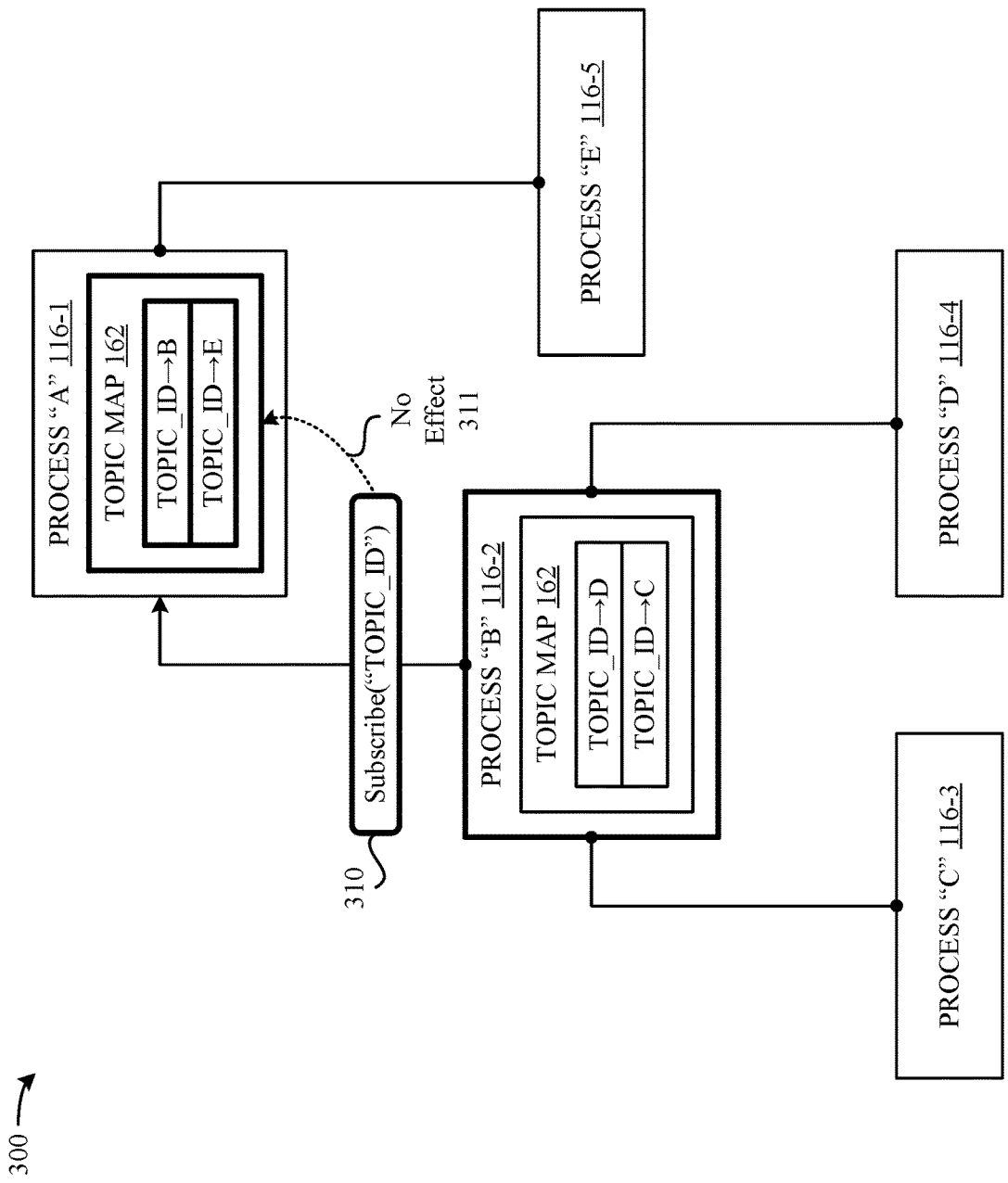

FIG. 3F extends the conceptual diagram 300, and illustrates what can occur when the process 116-2 potentially issues a message 310 to subscribe to the topic "TOPIC_ID". As shown in FIG. 3F, the message 310 has no effect (illustrated as 311) on the state of the topic map 162 maintained by the process 116-1, as this would be redundant information. However, the process 116-2 can be configured to update its own configuration so that the process 116-2 knows to take action any time a publication request associated with the topic "TOPIC_ID" is received. In one example, the process 116-2 can maintain an internal record of the topics to which the process 116-2 is subscribed, such that the topic map 162 only serves to identify child processes 116 (of the process 116-2) that are subscribed to the topic. In another example, the process 116-2 can add an entry (not illustrated in FIG. 3F) to its topic map 162, where the entry associates the topic "TOPIC_ID" with the process 116-2 itself. It is noted that these approaches are exemplary, and that each process 116 can implement any approach for effectively identifying the topics to which the process 116 itself is subscribed.

Figure 3G:
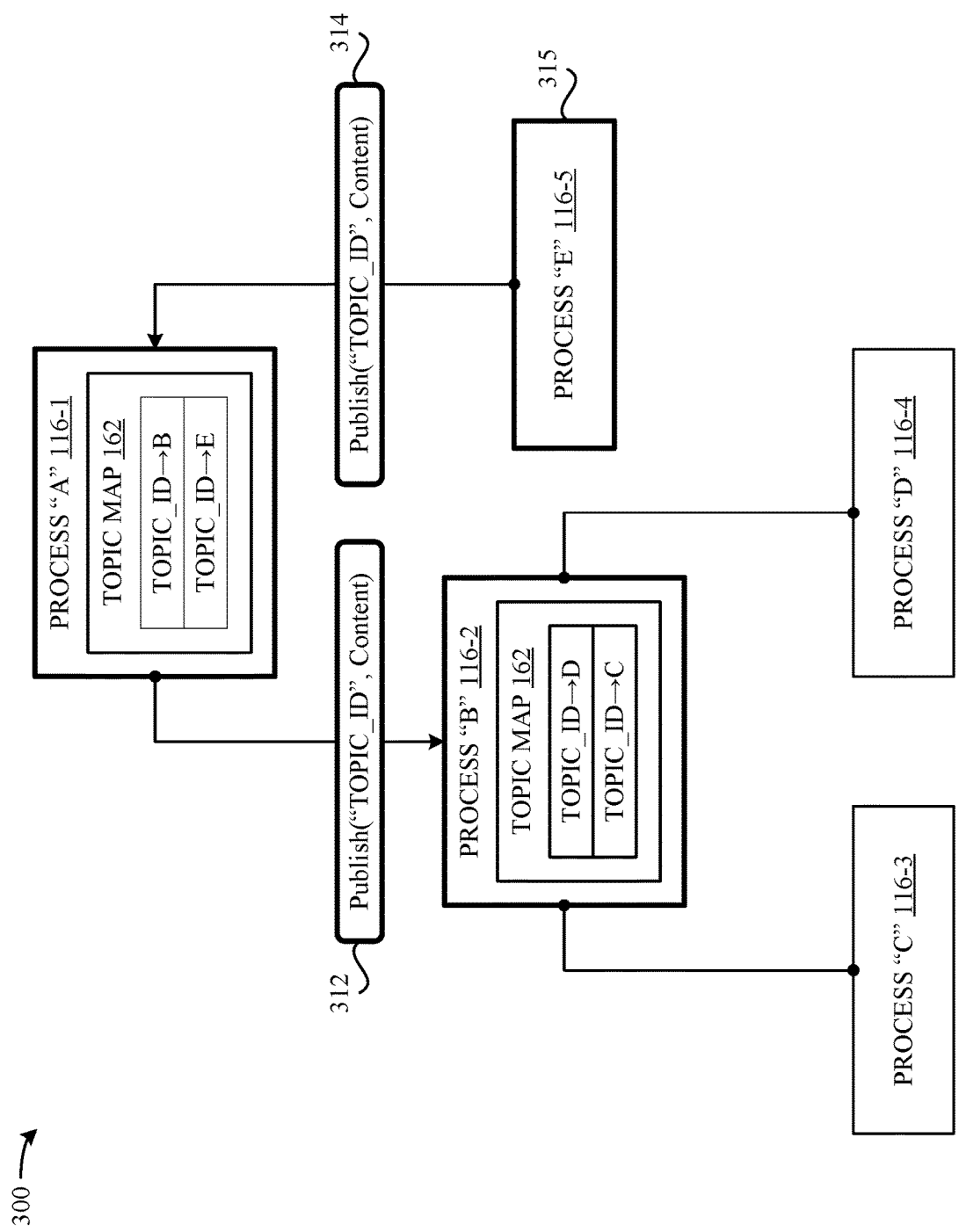

FIG. 3G extends the conceptual diagram 300, and illustrates what can occur when the process 116-1 issues a publication request associated with the topic "TOPIC_ID". As shown in FIG. 3G, the process 116-1 can reference the topic map 162 to identify that publication requests should be forwarded to the processes 116-2 and 116-5 as messages 312 and 314, respectively. Notably, it is not necessary for the process 116 to distinguish whether the processes 116-2 and 116-5 are (i) subscribed to the topic "TOPIC_ID" themselves, or (i) are merely responsible to identify, within their own topic maps 162, other processes 116 (if any) to which the received publication request should be forwarded. In particular, and as previously described herein, the processes 116-2 and 116-5 are configured to take the appropriate action based on their own configurations/topic maps 162, thereby eliminating the burden that would otherwise be placed on the process 116-1 for maintaining this information. In this regard, the overall size of the topic maps 162—as well as the publication requests themselves—can be substantially reduced, thereby providing a highly-efficient operational approach.

Accordingly, as shown in FIG. 3G, the message 312 can cause the process 116-2 to reference its topic map 162 to identify the processes 116 to which the message 312 should be forwarded, which is described below in greater detail in conjunction with FIG. 3H. Additionally, the message 314 can cause the process 116-5—which itself is subscribed to the topic "TOPIC_ID"—to perform an action 315 in response to receiving the publication request 314. According to some embodiments, the action 315 can represent any function capable of being performed by the process 116-5, e.g., displaying information, processing information, requesting/providing additional information, and so on.

Figure 3H:
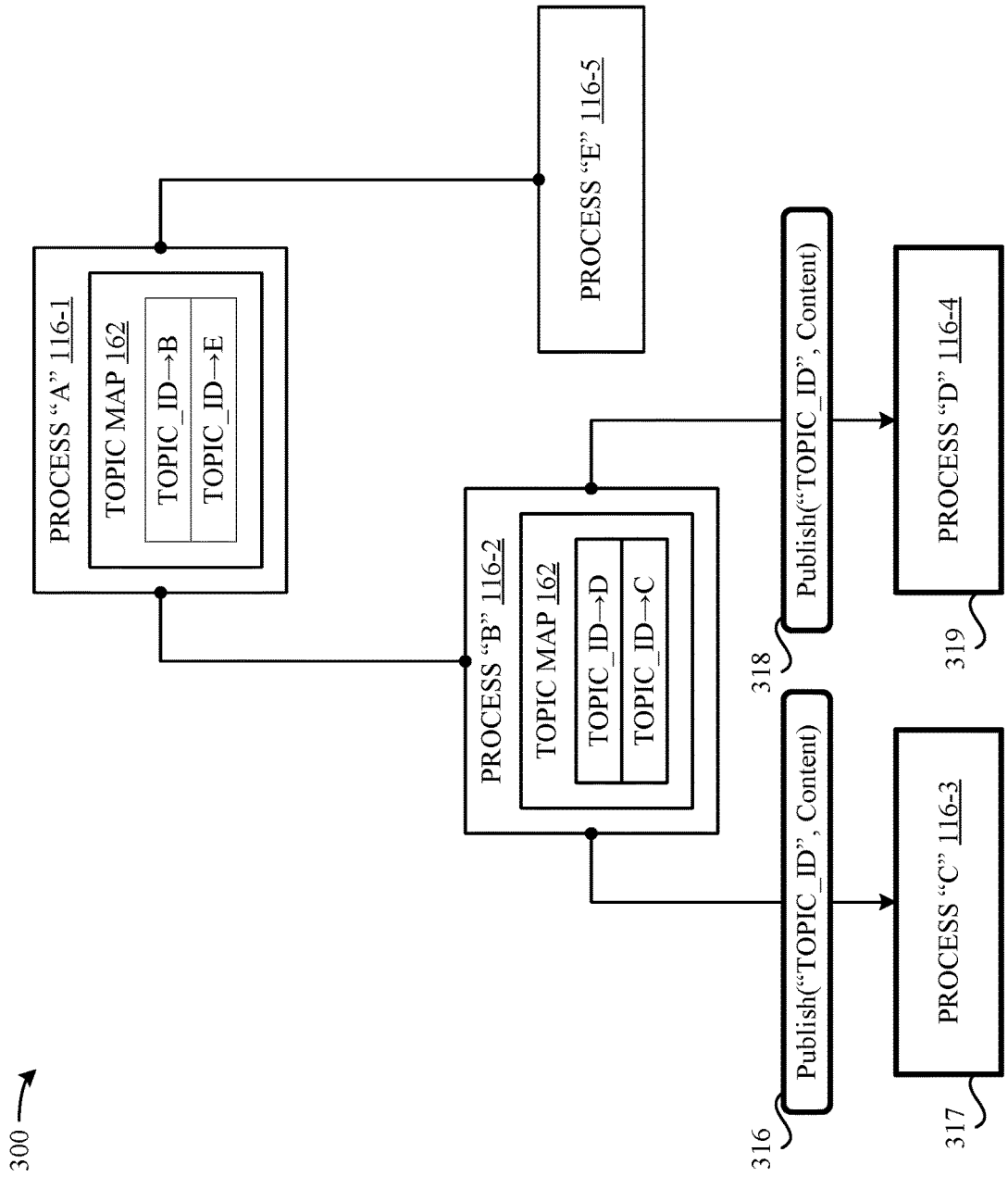
Figure 31:
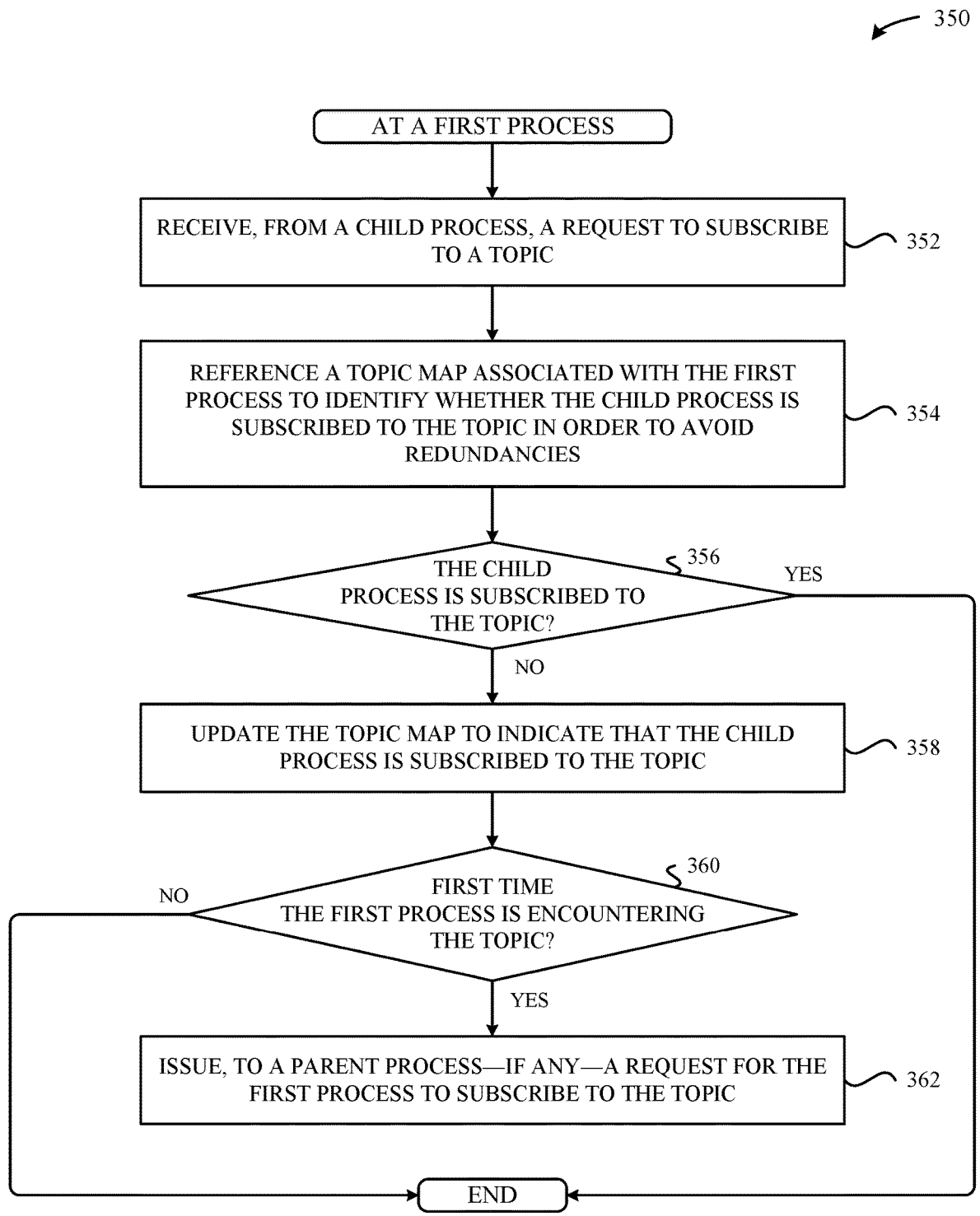

FIG. 3H extends the conceptual diagram 300, and illustrates what can occur when the process 116-2 receives the message 312. As shown in FIG. 3H, the process 116-2 references its topic map 162 and identifies that both the processes 116-3 and 116-4 are subscribed to the topic "TOPIC_ID". In turn, the process 116-2 issues publication requests to the processes 116-3 and process 116-4 as messages 316 and 318, respectively, and causes them to perform actions 317 and 319, respectively.

Accordingly, the conceptual diagram 300 illustrated across FIGS. 3A-3H sets forth the manner in which different processes 116 organized within a hierarchy can subscribe to publications associated with topics. It is noted that the embodiments described herein also support unsubscribe requests that can be issued by the different processes 116, but are being omitted from FIGS. 3A-3H in the interest of simplifying this disclosure. For example, subsequent to what is illustrated in FIG. 3H, the process 116-4 can issue, to the process 116-2, an unsubscribe request associated with the topic "TOPIC_ID". In turn, the process 116-2 can update its topic map 162 to remove the entry that corresponds to the process 116-4. However, because the process 116-2 itself—as well as the process 116-3—remain subscribed to the topic "TOPIC_ID", the process 116-2 will not issue an unsubscribe request to the process 116-1.

Figure 3J:
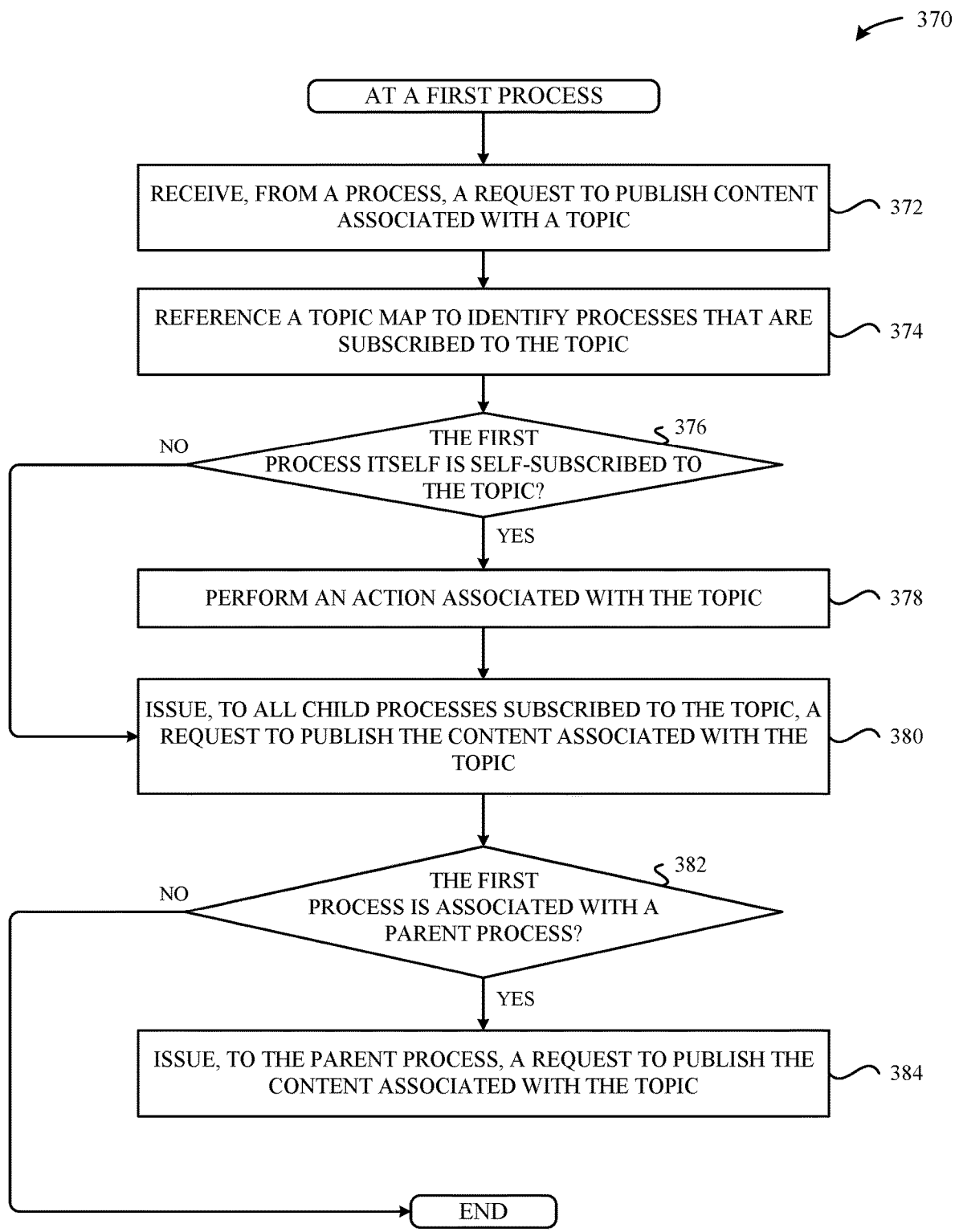

Additionally, FIGS. 3I-3J illustrate flow diagrams that provide high-level breakdowns of the techniques described above in conjunction with FIGS. 3A-3H. In particular, FIG. 3I illustrates a method 350 that enables a given process 116—referred to in FIG. 3I as a first process 116—to handle subscription requests received from child processes 116, according to some embodiments. As shown in FIG. 3I, the method 350 begins at step 352, where the first process 116 receives, from a child process 116, a request to subscribe to a topic (e.g., as described above in conjunction with FIGS. 3B-3E). At step 354, the first process 116 references its topic map 162 to identify whether the child process 116 (that issued the request) is already subscribed to the topic (e.g., as described above in conjunction with FIGS. 3B-3F) in order to avoid redundancies.

At step 356, the first process 116 determines whether the child process 116 is already subscribed to the topic. If, at step 356, the first process 116 determines that the child process 116 is already subscribed to the topic, then the method 350 ends, as no further action is necessary. In particular, the first process 116 can assume that a parent process 116 (to the first process 116)—if any—was previously notified of the topic in conjunction with a previous request issued by the child process 116 to subscribe to the topic. Otherwise, the method 350 proceeds to step 358, where the first process 116 updates its topic map 162 to indicate that the child process 116 is subscribed to the topic (e.g., as described above in conjunction with FIGS. 3B-3F).

Next, at step 360, the first process 116 determines whether it is encountering the topic for the first time. In particular, if the first process 116 already encountered the topic at an earlier time—e.g., in conjunction with a previous request issued by the child process 116 to subscribe to the topic, as described above—it can be assumed that a parent process 116 to the first process 116—if any—was previously notified of the topic. In this regard, no indication of the request received at step 352 needs to be provided to the parent process 116, and the method 350 can end. Conversely, if the first process 116 is encountering the topic for the first time—i.e., by way of the request received at step 352—then the method proceeds to step 362, where the first process 116 issues, to a parent process 116—if any—a request for the first process 116 to subscribe to the topic (e.g., as described above in conjunction with FIGS. 3B-3F).

Additionally, FIG. 3J illustrates a method 370 that enables a given process 116—referred to in FIG. 3J as a first process 116—to handle publication requests received from other processes 116, according to some embodiments. As shown in FIG. 3J, the method 370 begins at step 372, where the first process 116 receives, from a process 116—e.g., a child process 116, or a parent process 116—a request to publish content associated with a topic (e.g., as described above in conjunction with FIGS. 3B-3F). At step 374, the first process 116 references its topic map 162 to identify other processes 116 that are subscribed to the topic (e.g., as described above in conjunction with FIGS. 3B-3F). At step 376, the first process 116 determines whether it is self-subscribed to the topic (e.g., as described above in conjunction with FIGS. 3B-3F). If, at step 376, the first process 116 determines that it is self-subscribed to the topic, then the method 370 proceeds to step 378, where the first process 116 performs an action associated with the topic (e.g., as described above in conjunction with FIGS. 3B-3F). Otherwise, the method 370 proceeds to step 380, where the first process 116 issues, to all child processes 116 subscribed to the topic, a request to publish the content associated with the topic (e.g., as described above in conjunction with FIGS. 3B-3F). It is noted that the first process 116 can carry out step 380 with a higher level of precision without departing from the scope of this disclosure. In particular, the first process 116 can determine that the request (received at step 372) was received from a particular child process 116 among other child processes 116, and only issue requests (to publish the content associated with the topic) to the other child processes 116.

At step 382, the first process 116 determines whether it is associated with a parent process 116. If, at step 382, the first process 116 determines that it is associated with a parent process, then the method 370 proceeds to step 384, where the first process 116 issues, to the parent process 116, a request to publish the content associated with the topic (e.g., as described above in conjunction with FIGS. 3B-3F). Otherwise, the method 370 ends, as it is not necessary for the first process 116 to take further action for the publication request to reach the appropriate processes 116. It is noted that the first process 116 can carry out step 384 with a higher level of precision without departing from the scope of this disclosure. In particular, the first process 116 can determine whether the request (received at step 372) was received from a parent process 116 (as opposed to a child process 116), and forego carrying out step 384, as it is not necessary to issue a request (to publish the content associated with the topic) back up to the parent process 116.

Figure 4A:
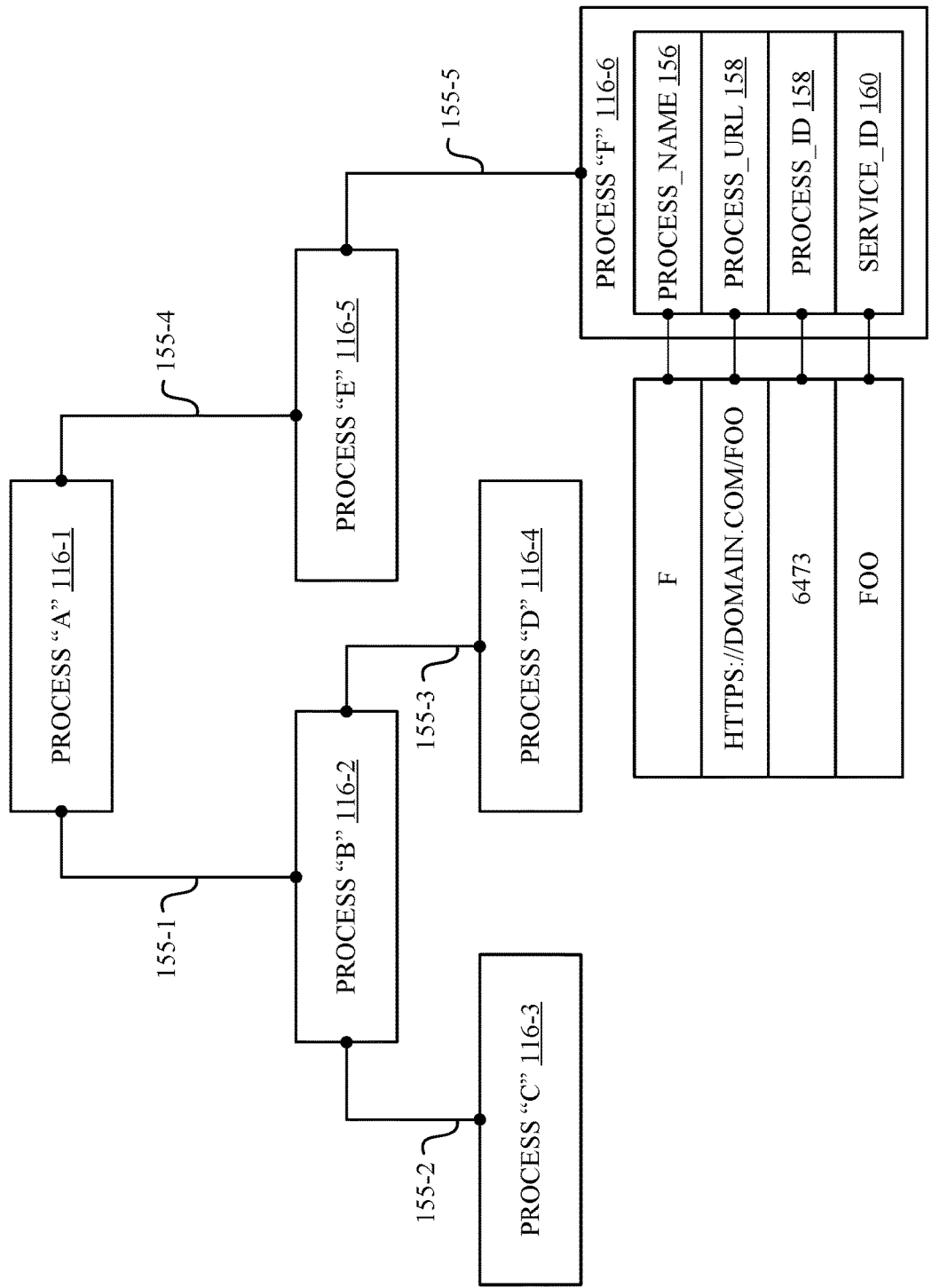
FIGS. 4A-4G set forth conceptual diagrams that illustrate how various processes can access services provided by one another, according to some embodiments.

Accordingly, FIGS. 3A-3J set forth how various processes 116 can distribute information according to a publication/subscription approach, according to some embodiments. As previously noted herein, the embodiments described herein also enable various processes 116 to access services provided by one another, the details of which will now be described in conjunction with FIGS. 4A-4E. As shown in FIG. 4A, a conceptual diagram 400 involves six different processes 116-1 through 116-6 that are arranged into an example hierarchy and are communicably linked by way of the messaging channels 155-1 through 155-5. In the interest of clarifying the illustrations throughout FIG. 4A-4E, each of the processes 116-1 through 116-6 are assigned a respective process name 156, e.g., "A" for the process 116-1, "B" for the process 116-2, "C" for the process 116-3, "D" for the process 116-4, "E" for the process 116-5, and "F" for the process 116-6. Additionally, various properties (described above in conjunction with FIG. 2) associated with the process 116-6 are assigned example values in the interest of clarifying the illustrations throughout FIGS. 4A-4E. For example, "https://domain.com/foo" for the process URL 158, "6473" for the process ID 159, and "Foo" for the service ID 160 of a service that will be implemented by the process 116-6. Accordingly, FIG. 4A illustrates an initial state of the hierarchy formed across the processes 116-1 through 116-6, where no services have been registered/accessed by the processes 116.

Figure 4B:
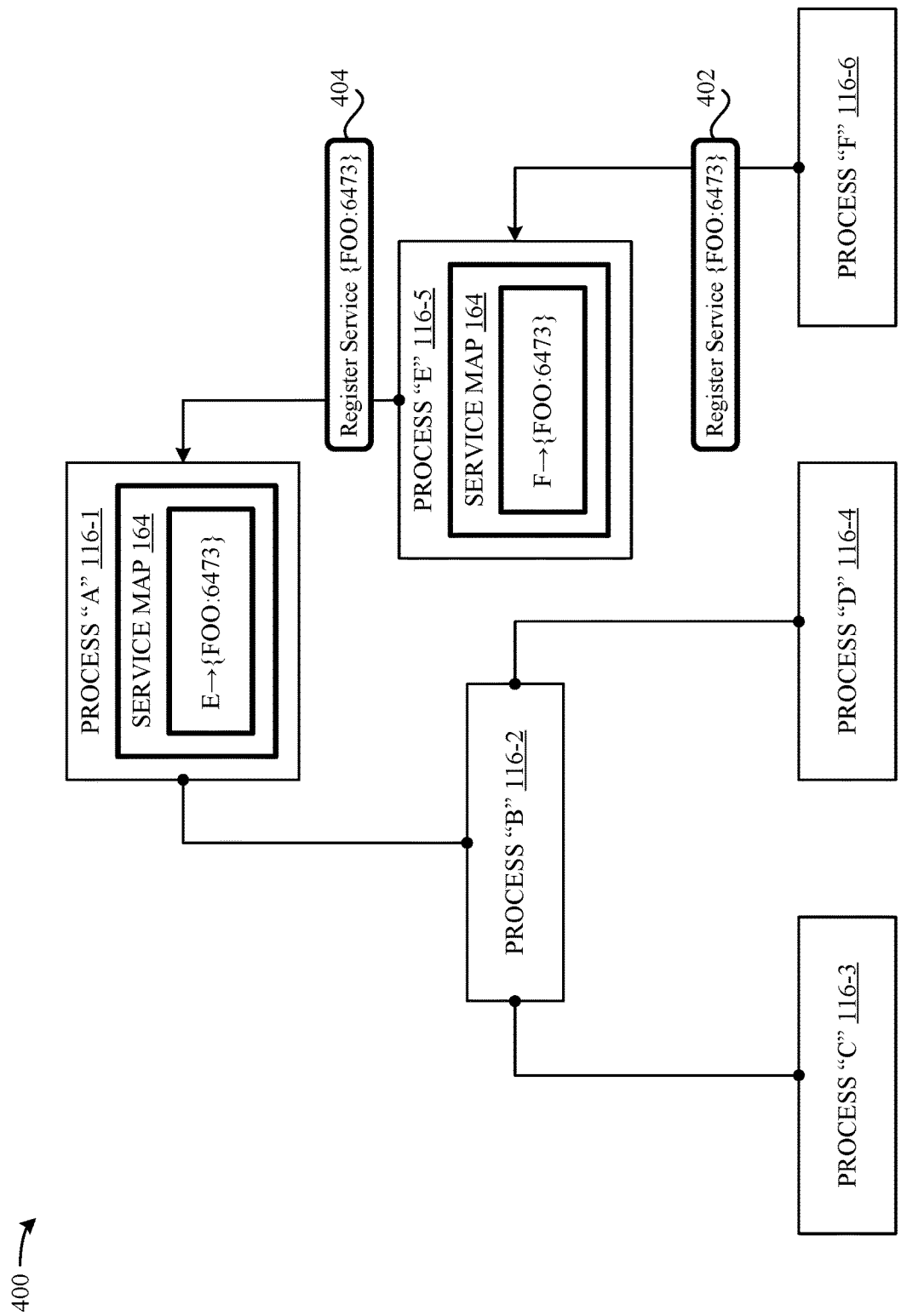

FIG. 4B extends the conceptual diagram 400, and illustrates what can occur when the process 116-6 issues a message 402 to register the service "Foo". According to some embodiments, the message 402 can take any form, and include, for the process 116-6, the process name 156, the process URL 158, and the service ID 160. According to some embodiments, the process URL 158 and the service ID 160 together form a unique address that can be referred to by other processes 116 that ultimately seek to access the service "Foo" implemented by the process 116-6. As shown in FIG. 4B, the process 116-6 can transmit the message 402 to its parent process 116-5 by way of the messaging channel 155 that is formed between them. In turn, the process 116-5 can update its service map 164 to include an entry that associates the unique address "Foo:6473" (for the service) with the process 116-6. Again, it is noted that the directionality of the association between the service "Foo" and the process 116-6 is not required, such that any approach for maintaining the association can be implemented without departing from the scope of this disclosure.

As a result of adding an entry to the service map 164, the process 116-5 will know, upon receipt of a service connection request—e.g., from the process 116-1 itself, or from the process 116-1 on behalf of another process 116—to forward the service connection request to the process 116-6. Notably, it can be useful for the process 116-4 to forward the message 402—illustrated as the message 404 in FIG. 4B—upward within the hierarchy—i.e., to the parent process 116-1—to enable the effective distribution of service connection requests that will be issued after the service "Foo" is registered. As a result, the process 116-1 updates its service map 164 to include an entry that identifies that the service "Foo" is implemented by the process 116-6 and can be reached by way of the process 116-5.

Figure 4C:
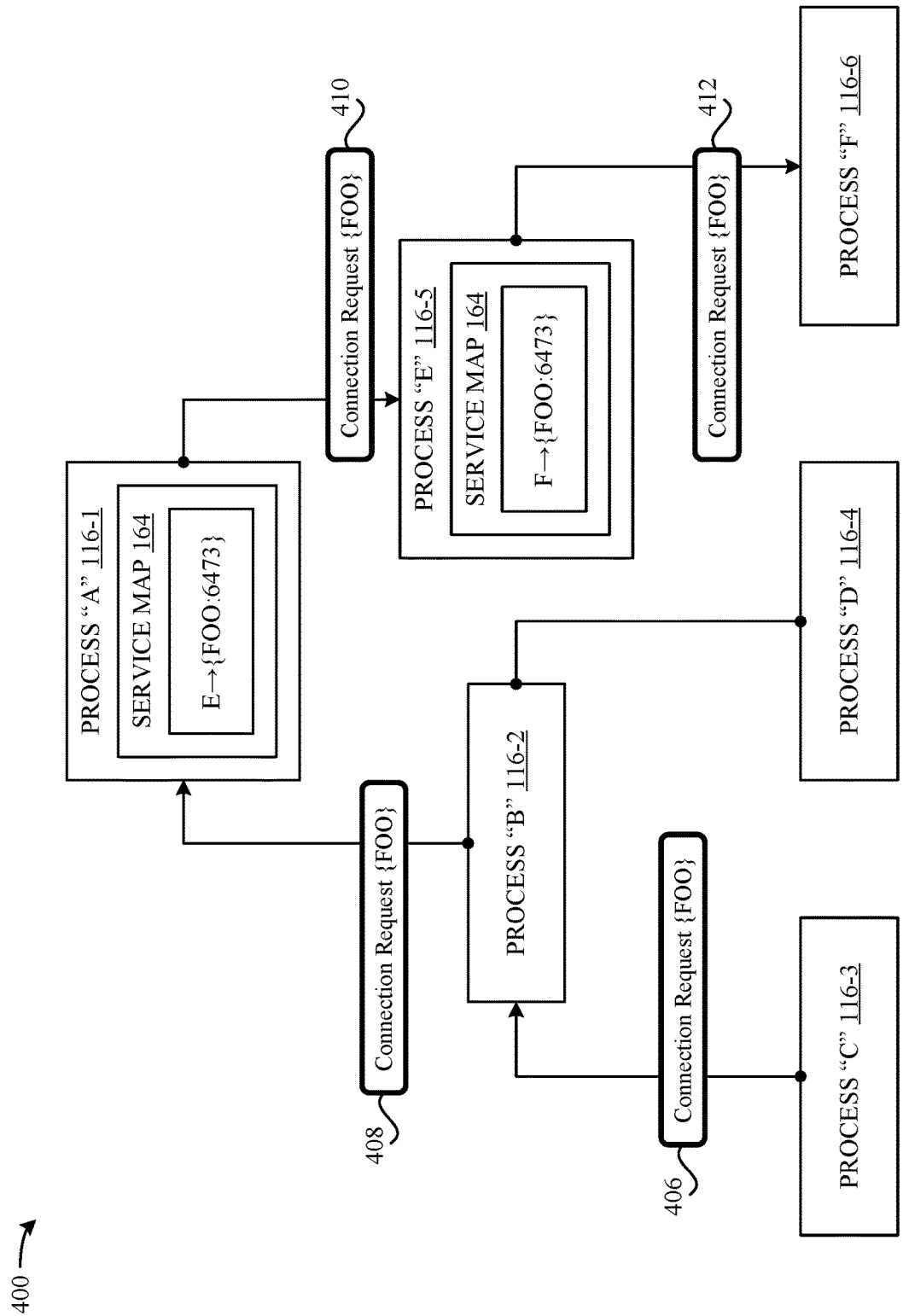

FIG. 4C extends the conceptual diagram 400, and illustrates what can occur when the process 116-3 issues a service connection request that takes the form of a message 406, where the service connection request references the service "Foo". According to some embodiments, the service connection request can simply refer to the name of the service, as the process 116-3 presumably will not be privy to the service ID 160 associated with the process 116, if any, that is implementing the service. In turn, the process 116-2 can reference its service map 164 to identify whether any child processes 116 are known to implement the service "Foo". In the scenario illustrated in FIG. 4C, no child processes 116 of the process 116-2 implement the service, so the process 116-2 forwards the service connection request to its parent process—the process 116-1—in the form of a message 408. In turn, the process 116-1 references its service map 164 to identify whether any child processes 116 implement the service "Foo". As a consequence of the service registration that occurred in FIG. 4B, the process 116-1 includes an entry within its service map 164 that matches the service specified by the message 408. In particular, the process 116-1 identifies that its immediate child process 116—the process 116-5—can function as a conduit to reach the service implemented by the process 116-6. In response, the process 116-1 forwards the service connection request to the process 116-5 in the form of a message 410. In turn, the process 116-5 references its service map 164 to identify whether any child processes 116 implement the service "Foo". Again, as a consequence of the service registration that occurred in FIG. 4B, the process 116-5 includes an entry within its service map 164 that matches the service referenced by the message 410. In response, the process 116-5 forwards the service connection request to the process 116-6 in the form of a message 412, thereby enabling the process 116-6 to identify that the process 116-3 is seeking to access the service "Foo" that is implemented by the process 116-6.

Figure 4D:
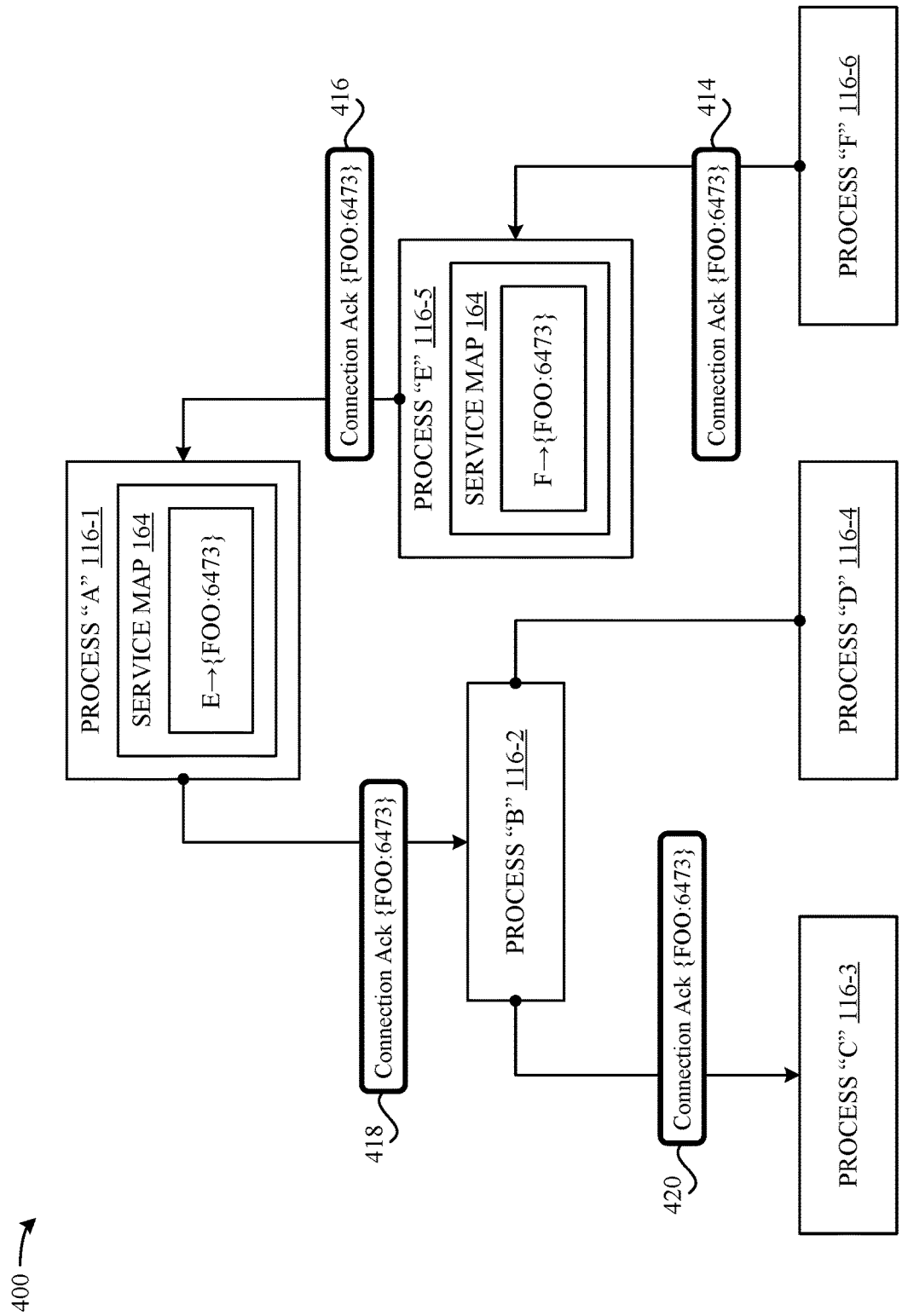

FIG. 4D extends the conceptual diagram 400, and illustrates what can occur when the process 116-6 acknowledges the service connection request issued by the process 116-3. As shown in FIG. 4D, the process 116-6 can issue a connection acknowledgement in the form of a message 414, which can include both the process ID 159 and the service ID 160 (i.e., "Foo:6473") so that the process 116-3 can uniquely address the service with subsequent messages. To communicate the connection acknowledgement, the path through which the service connection request traveled can be traversed in a reverse-order. According to some embodiments, each of the processes 116 involved in transmitting the original service connection request between the process 116-3 and the process 116-6 can maintain a temporary mapping that identifies respective child/parent applications processes 116 (i) from which service connection requests were received (if any), and (ii) to which service connection requests were transmitted (if any). This temporary mapping can be established based on the assumption that a connection acknowledgement will be transmitted in a reverse direction along the path a relatively short amount of time after an initial service connection request is issued. In this regard, each of the processes 116 can be configured to clear the temporary mapping if the connection acknowledgement is not transmitted within a threshold amount of time. This can occur, for example, when a process 116 issues a service connection request for a service that is not currently implemented within the hierarchy, and a corresponding connection acknowledgement will not be issued.

It is noted that the reverse-path traversal technique described above is merely exemplary, and that any technique can be utilized to effectively identify the paths traversed by messages without departing from the scope of this disclosure. In this manner, and as set forth above, a given path can be reversed to enable responsive communications to be transmitted to the appropriate processes 116 without interfering with the structures of their respective service maps 164.

Figure 4E:
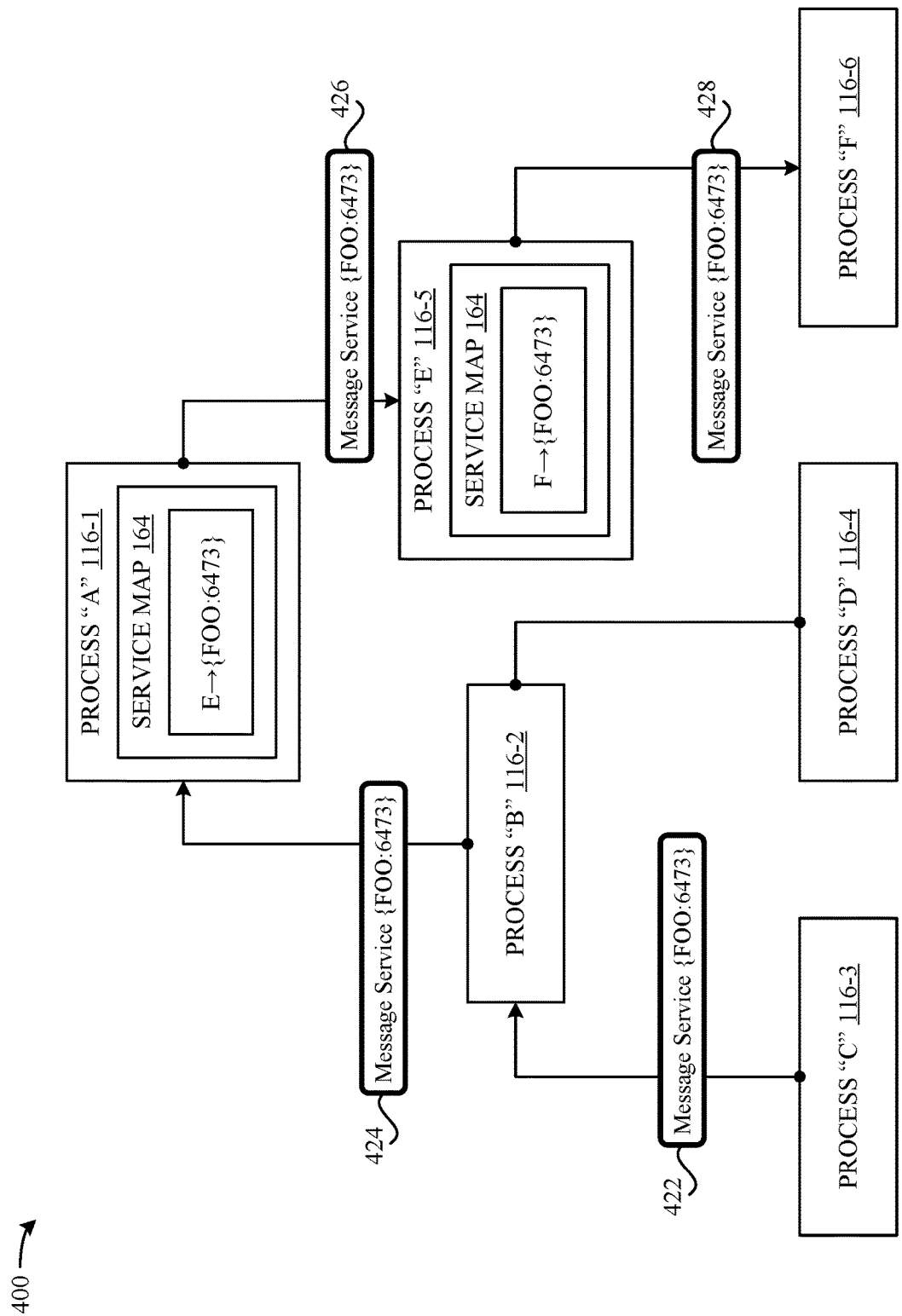

Accordingly, as shown in FIG. 4D, the message 414 can be forwarded as messages 416, 418, and 420, in a reverse order along the same path traveled by the messages 406-412 associated with the service connection request. In turn, and as shown in FIG. 4E, the process 116-3—as a result of the connection acknowledgement received in FIG. 4D—is now in possession of the necessary information (i.e., "Foo:3473") to uniquely address and reach the service "Foo" implemented by the process 116-6. In this regard, the process 116-3 can issue a message 422 to its parent process 116, the process 116-2. In turn, the message 422 evolves into the messages 424-428, as they are treated in a manner similar to the messages 408-412 (associated with the service connection request) previously described herein. In turn, the process 116-6 can receive and interpret the message 428, and reply (if necessary) using the same reverse-path traversal technique described herein.

Figure 4F:
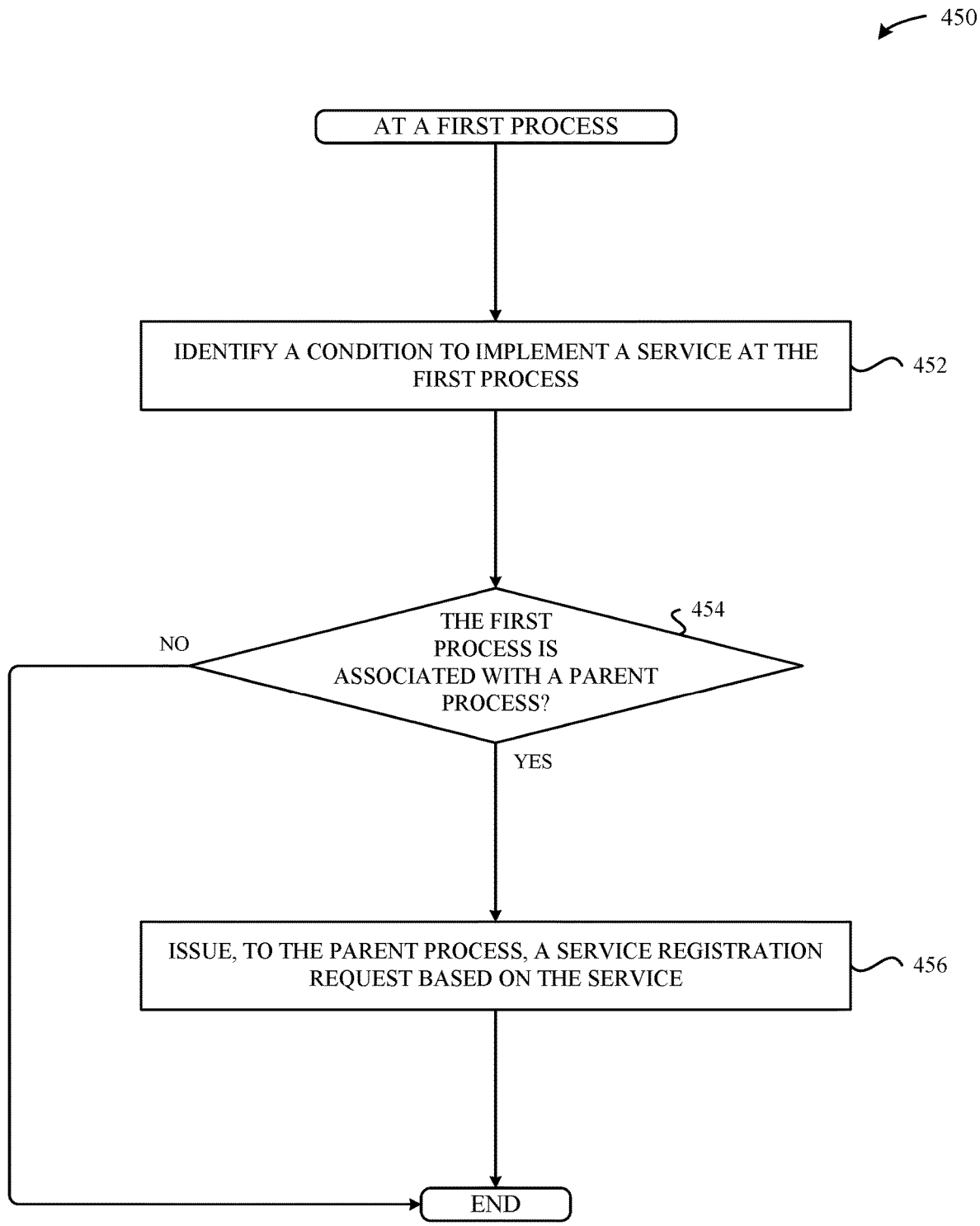
Figure 4G:
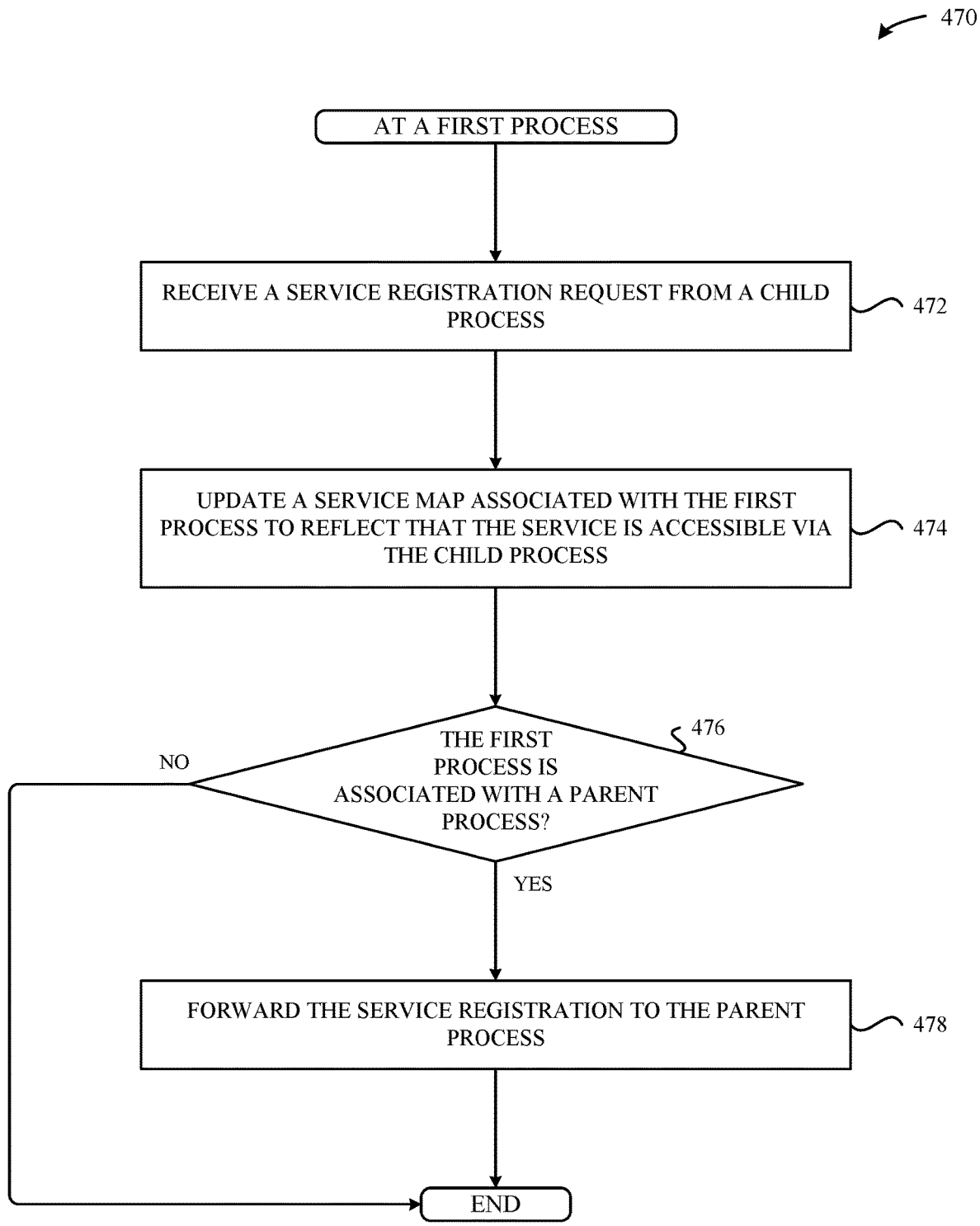

Additionally, FIGS. 4G-4F illustrate flow diagrams that provide high-level breakdowns of the techniques described above in conjunction with FIGS. 4A-4E. In particular, FIG. 4F illustrates a method 450 for a first process 116 seeking to register a self-implemented service with other processes 116, according to some embodiments. As shown in FIG. 4F, the method 450 begins at step 452, where the first process 116 identifies a condition to self-implement the service (e.g., as described above in conjunction with FIG. 4B). At step 454, the first process 116 determines whether it is associated with a parent process 116. If, at step 454, the first process 116 determines that it is associated with a parent process 116, then the method 450 proceeds to step 456, where the first process 116 issues, to the parent process 116, a service registration request based on the service that is being implemented (e.g., as described above in conjunction with FIG. 4B). Otherwise, the method 450 ends, as the first process 116 is not responsible to notify child processes 116—if any—of the service that is being implemented by the first process 116.

FIG. 4G illustrates a method 470 for a first process 116 to register a service that is implemented by a child process 116, according to some embodiments. As shown in FIG. 4G, the method 470 begins at step 472, where the first process 116 receives a service registration request from the child process 116 (e.g., as described above in conjunction with FIG. 4C). At step 474, the first process 116 updates a service map 164 associated with the first process 116 to reflect that the service is accessible via the child process 116 (e.g., as described above in conjunction with FIG. 4C). At step 476, the first process 116 determines whether it is associated with a parent process 116. If, at step 476, the first process 116 determines that it is associated with a parent process 116, then the method 470 proceeds to step 478, where the first process 116 forwards the service registration to the parent process 116 (e.g., as described above in conjunction with FIG. 4C). Otherwise, the method 470 ends, as the first process 116 is not responsible to notify child processes 116 of the service registration request.

Accordingly, FIGS. 4A-4G set forth how various processes 116 can access services provided by one another, according to some embodiments. Additionally, the disclosed techniques can enable the processes 116 to utilize different approaches when attempting to mitigate potential conflicts that can arise when two or more processes 116 within a hierarchy attempt to implement the same service. In particular, FIGS. 5A-5D describe a first approach that can be taken, which involves enabling duplicate services to be implemented in an organized manner. In particular, the first approach involves forcing a given process 116 to connect to the nearest process 116 that implements a service to which the process 116 is seeking to access.

Figure 5A:
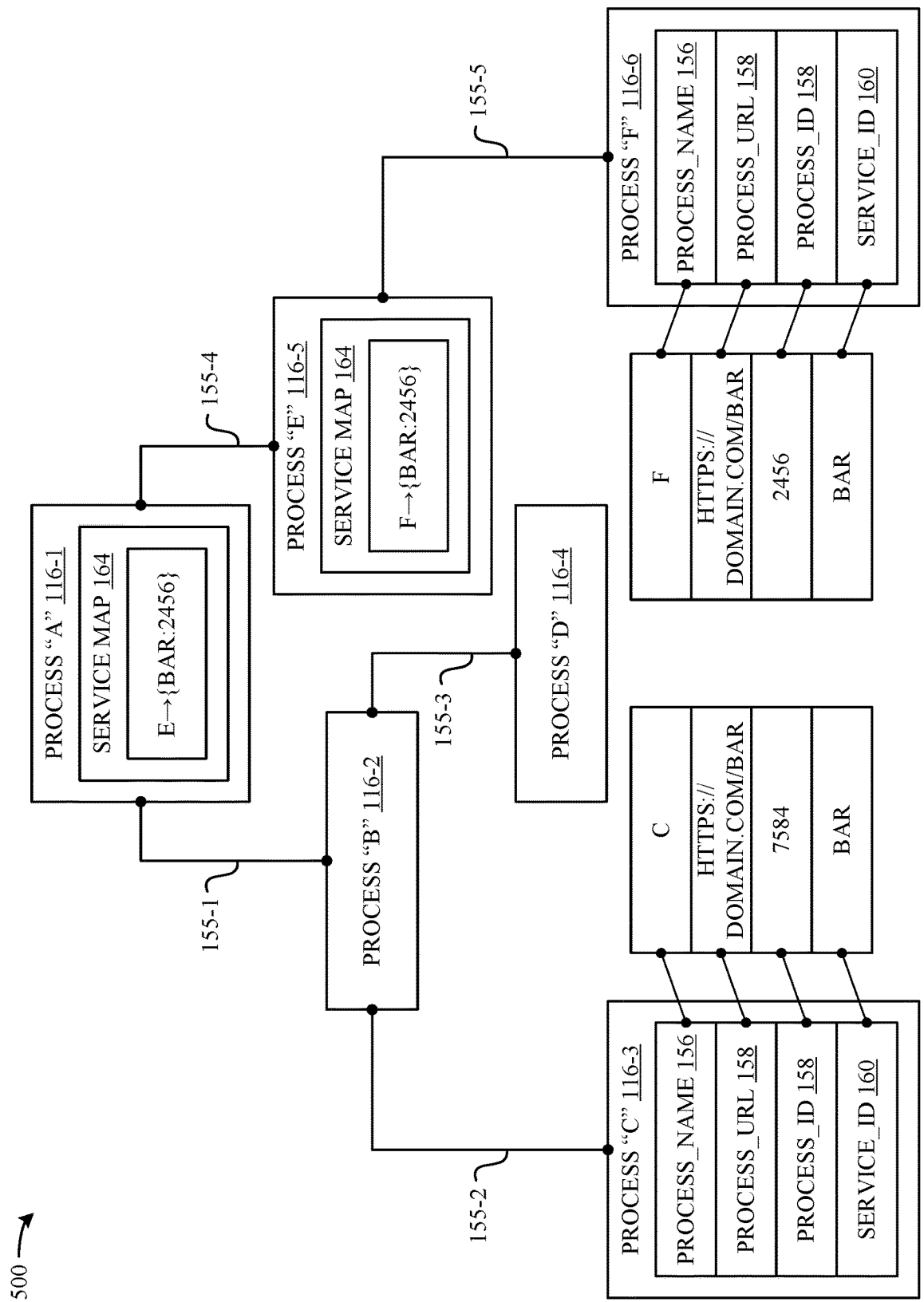
FIGS. 5A-5D set forth conceptual diagrams that illustrate how duplicate services can be implemented in an organized manner, according to some embodiments.

As shown in FIG. 5A, a conceptual diagram 500 involves six different processes 116-1 through 116-6 that are arranged into an example hierarchy and are communicably linked by way of the messaging channels 155-1 through 155-5. Again, in the interest of clarifying the illustrations throughout FIG. 5A-5D, each of the processes 116-1 through 116-6 are assigned a respective process name 156, e.g., "A" for the process 116-1, "B" for the process 116-2, "C" for the process 116-3, "D" for the process 116-4, "E" for the process 116-5, and "F" for the process 116-6. Additionally, various properties (described above in conjunction with FIG. 2) associated with the processes 116-3 and 116-6 are assigned example values in the interest of clarifying the illustrations throughout FIGS. 5A-5D. For example, the process 116-3 can take on "https://domain.com/bar" for the process URL 158, "7584" for the process ID 159, and "Bar" for the service ID 160 of a service to be implemented by the process 116-6. Continuing with this example, the process 116-6 can take on "https://domain.com/bar" for the process URL 158, "2456" for the process ID 159, and "Bar" for the service ID 160 of a service that is being implemented by the process 116-6.

Figure 5B:
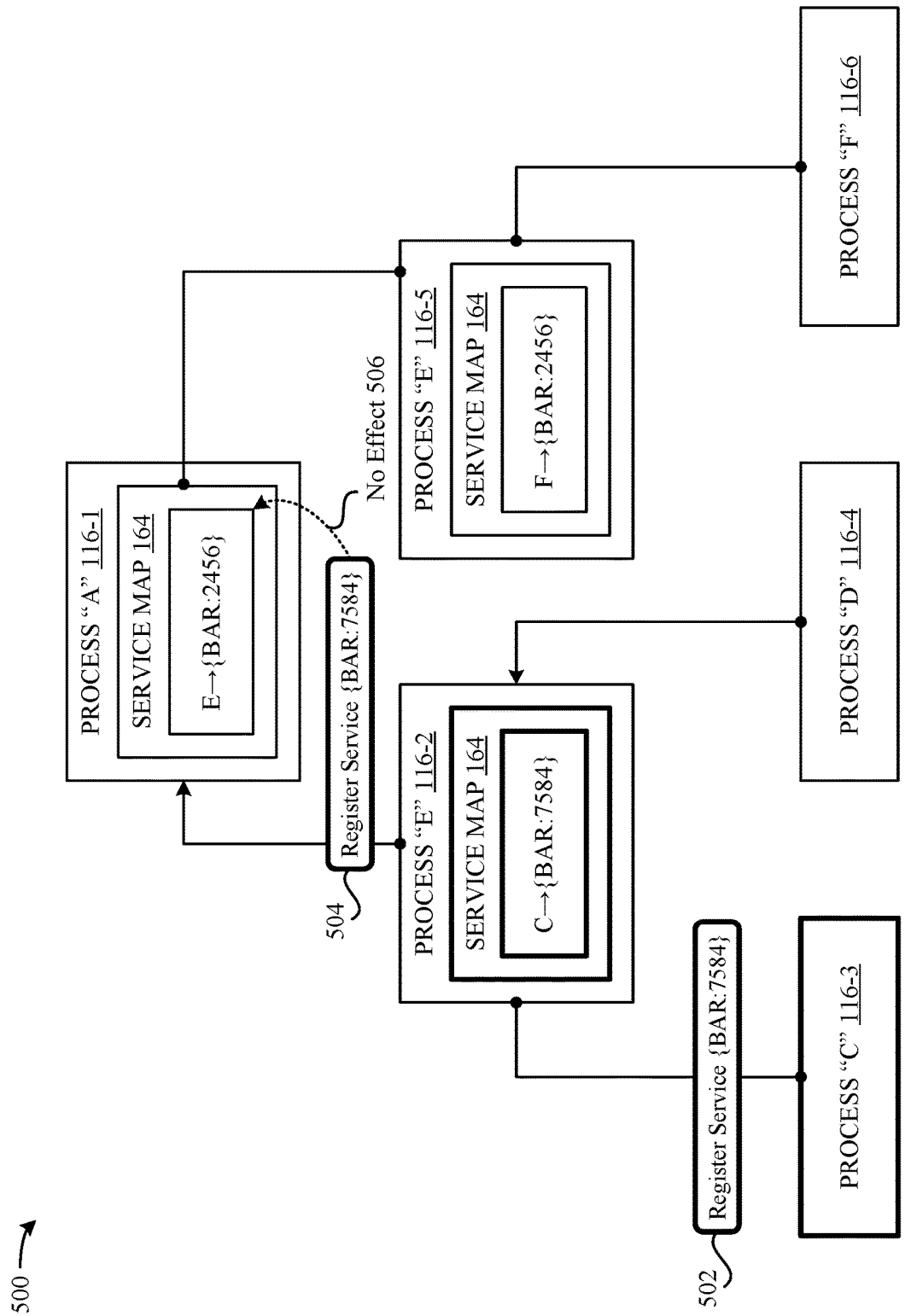
Figure 5C:
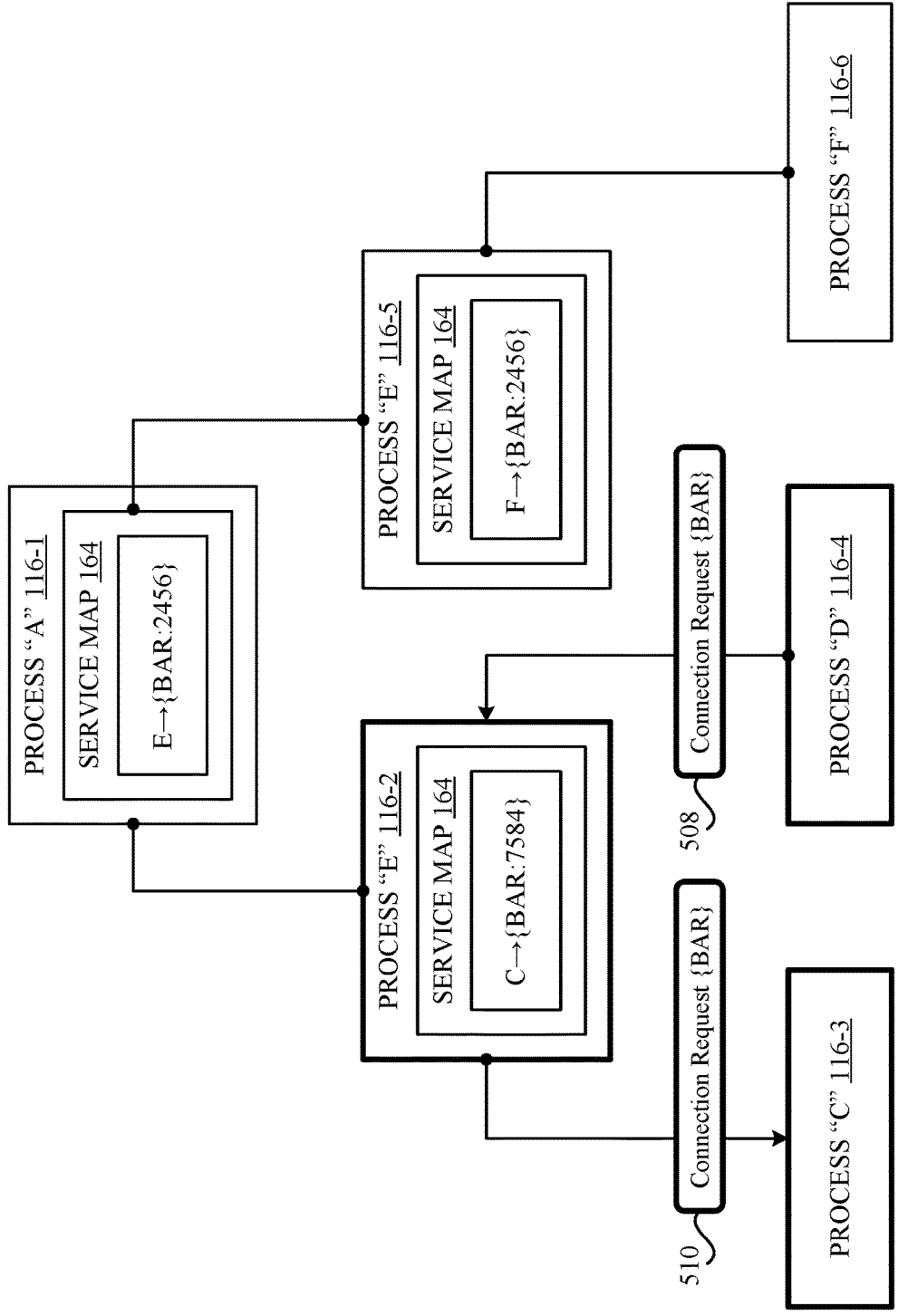
Figure 5D:
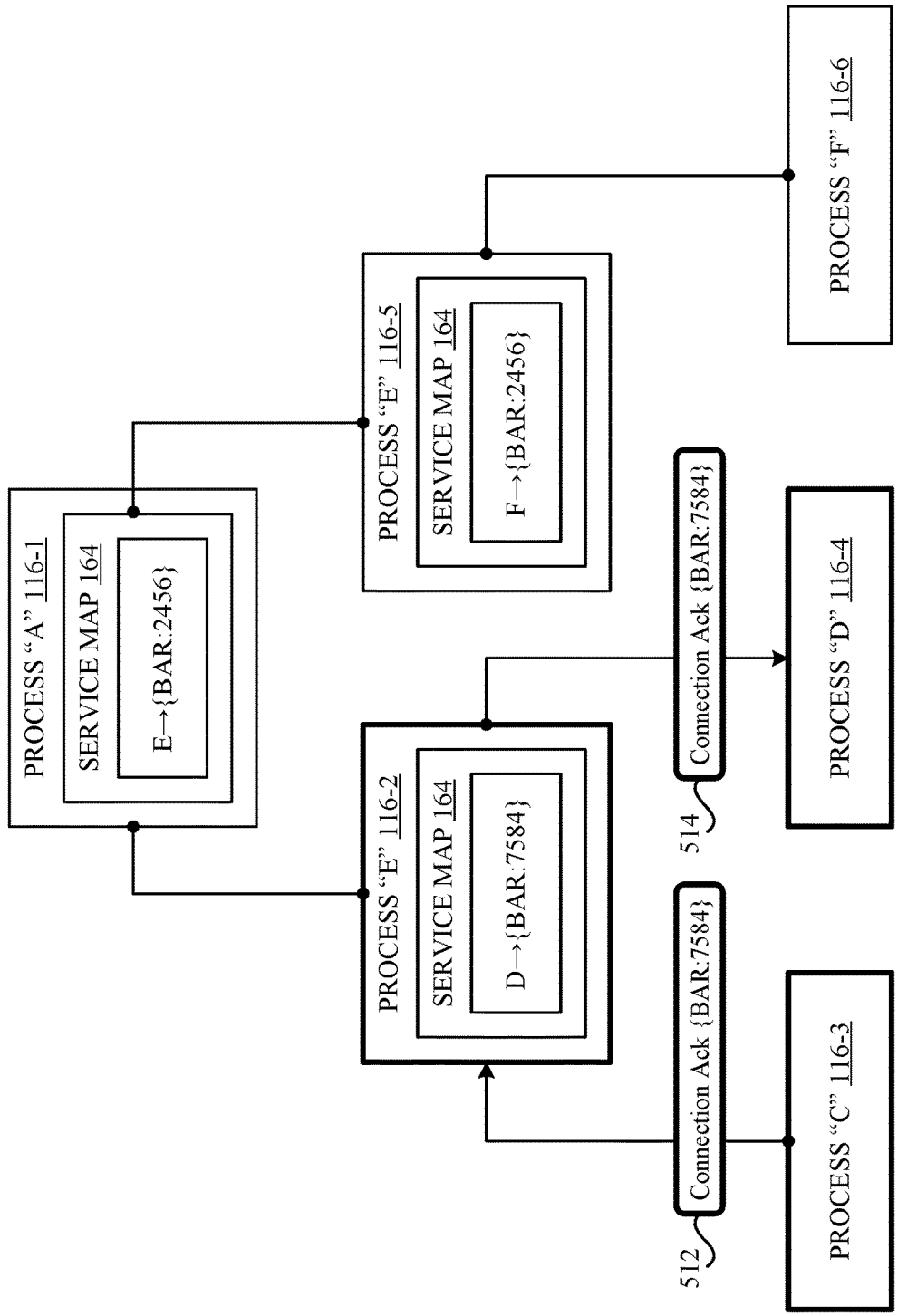

As shown in the scenario illustrated in FIG. 5A, the process 116-6 has already registered the service "Bar" with the processes 116-5 and 116-1 (e.g., as described above in conjunction with FIG. 4B). As shown in FIG. 5B, the process 116-3 registers the service "Bar" using a message 502, which results in an update to the service map 164 maintained by the process 116-2 (e.g., as described above in conjunction with FIG. 4B), as no mapping for the service "Bar" exists within the service map 164. However, the registration of the service "Bar" that would normally occur at the process 116-1 by way of a message 504 is disregarded—which is illustrated in FIG. 5B as element 506—as an entry already exists within the service map 164 managed by the process 116-1 for the service "Bar". In this regard, in FIG. 5C, when the process 116-4 issues a service connection request directed to the service "Bar" in the form of a message 508, the process 116-2 receives the message 402, and identifies—based on the service map 164 maintained by the process 116-2—that a message 510 should be transmitted to the process 116-3. In turn, in FIG. 5D, the process 116-3 can issue a connection acknowledgement in the form of a message 512, which is ultimately delivered to the process 116-4 by way of a message 514.

Accordingly, the techniques illustrated in FIGS. 5A-5D force a given process 116 to connect to the nearest process 116 that implements a service to which the process 116 is seeking to access, thereby enabling duplicate services to coexist within the hierarchy. Additionally, FIGS. 6A-6C describe a second approach that can be taken, which involves enforcing a policy that no duplicate services can exist within a given hierarchy.

Figure 6A:
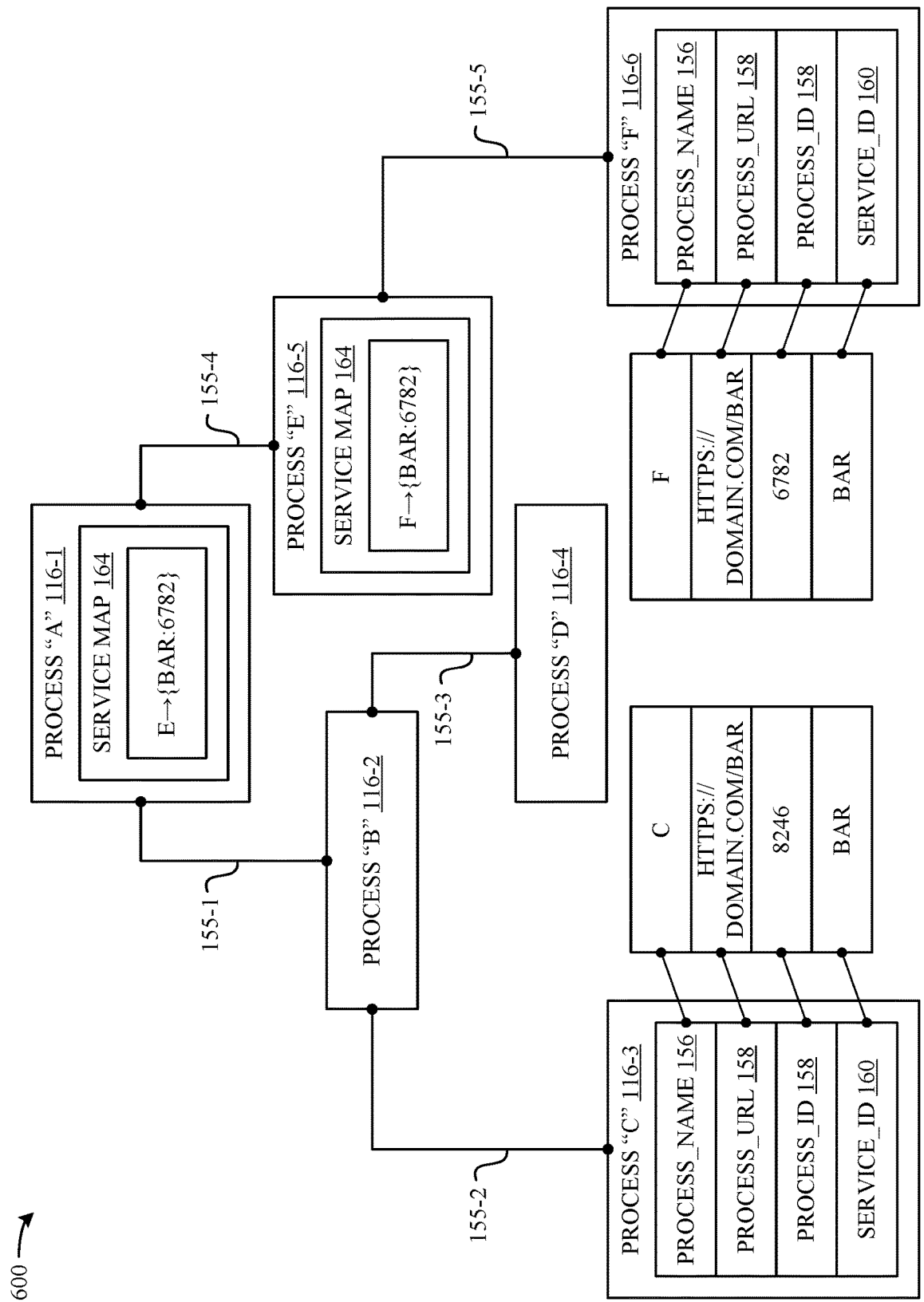
FIGS. 6A-6C set forth conceptual diagrams that illustrate how duplicate services can be forbidden, according to some embodiments.

As shown in FIG. 6A, a conceptual diagram 600 involves six different processes 116-1 through 116-6 that are arranged into an example hierarchy and are communicably linked by way of the messaging channels 155-1 through 155-5. Again, in the interest of clarifying the illustrations throughout FIG. 6A-6C, each of the processes 116-1 through 116-6 are assigned a respective process name 156, e.g., "A" for the process 116-1, "B" for the process 116-2, "C" for the process 116-3, "D" for the process 116-4, "E" for the process 116-5, and "F" for the process 116-6. Additionally, various properties (described above in conjunction with FIG. 2) associated with the processes 116-3 and 116-6 are assigned example values in the interest of clarifying the illustrations throughout FIGS. 6A-6C. For example, the process 116-3 can take on "https://domain.com/bar" for the process URL 158, "8246" for the process ID 159, and "Bar" for the service ID 160 of a service to be implemented by the process 116-6. Continuing with this example, the process 116-6 can take on "https://domain.com/bar" for the process URL 158, "6782" for the process ID 159, and "Bar" for the service ID 160 of a service that is being implemented by the process 116-6.

Figure 6B:
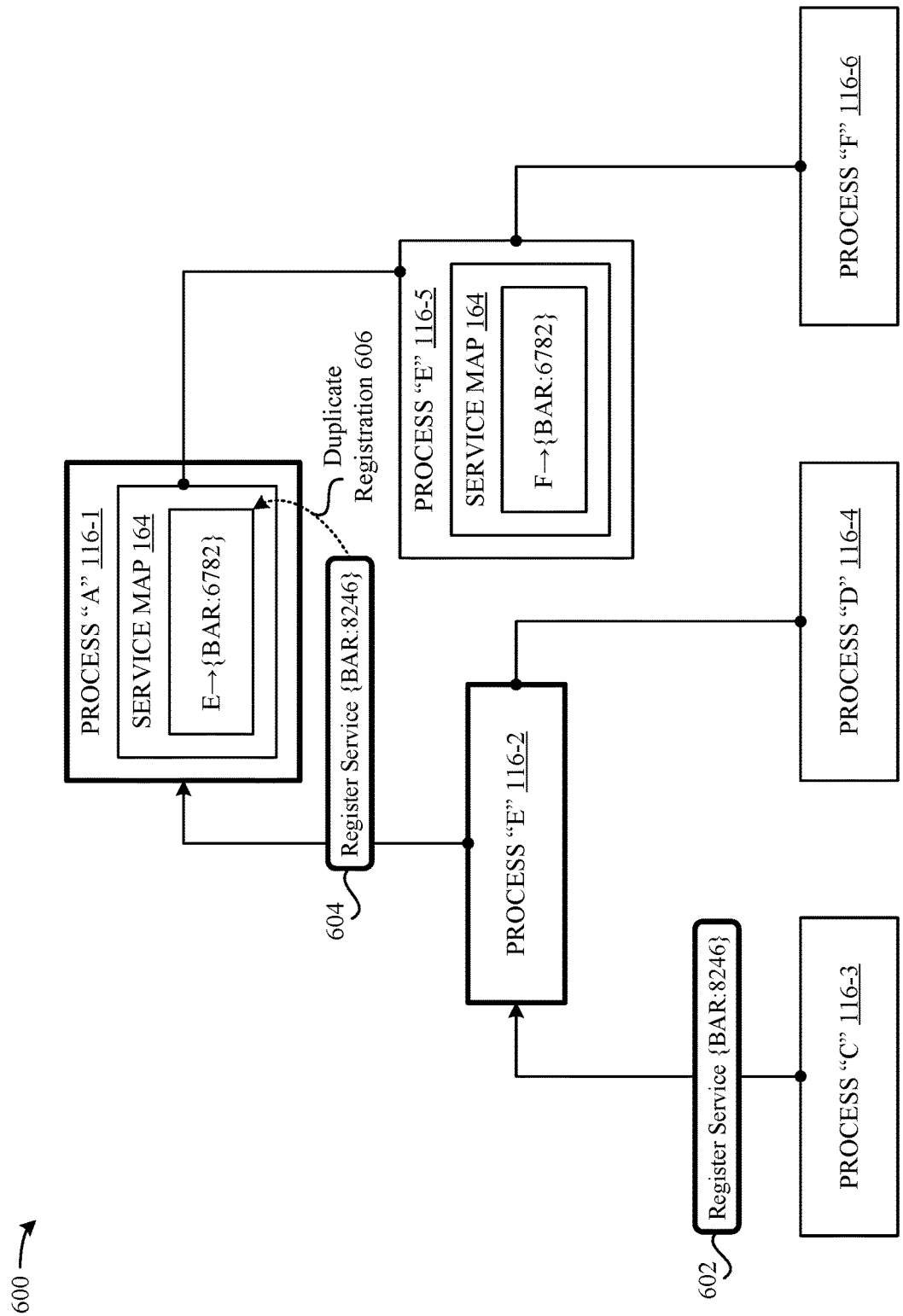

Additionally, as shown in scenario illustrated in FIG. 6A, the process 116-6 has already registered the service "Bar" with the processes 116-5 and 116-1 (e.g., as described above in conjunction with FIG. 5A). As shown in FIG. 6B, the process 116-3 attempts to register the service "Bar" using a message 602. In turn, the process 116-2 receives the message 602. However, instead of blindly adding an entry to the service map 164 maintained by the process 116-2, the process 116-2 forwards the message 602 to its parent, the process 116-1, in the form of a message 604, in order to identify whether the service "Bar" has already been registered by another process 116. It is noted that this check can be performed by the process 116 that lies at the root of the hierarchy, as the techniques set forth herein involve service registrations that propagate upward through the hierarchy until the root process 116 is reached. As shown in FIG. 6B, the process 116-1 identifies, based on the service map 164, that a registration for the service "Bar" was already performed by another process 116, which is illustrated as the duplicate registration 606.

Figure 6C:
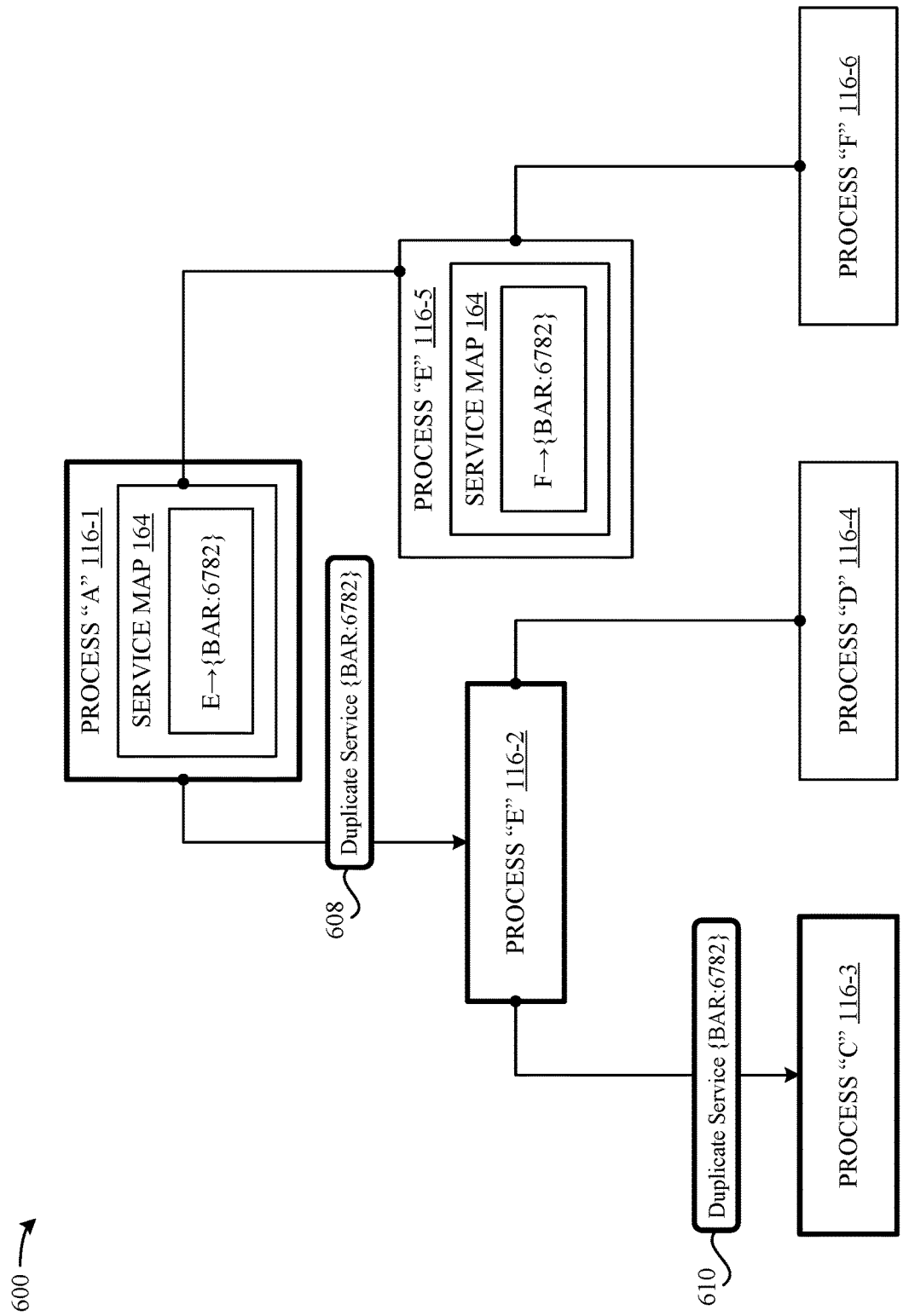

In response, in FIG. 6C, the process 116-1 can utilize the reverse traversal techniques described herein to effectively communicate to the process 116-3 that the service "Bar" is already registered. In particular, and as shown in FIG. 6C, the process 116-1 issues a duplicate service notification in the form of a message 608 to the process 116-2. In turn, the message 608 is forwarded by the process 116-2 in the form of a message 610. Notably, the duplicate service notification can include the process ID 159 and the service ID 160 of the process 116 that previously registered the service "Bar"—i.e., Service "Bar:6728". In this regard, the process 116-3 can issue a service connection request to access the service, as opposed to implementing the service itself.

It is noted that the techniques set forth herein encompass additional features that are not specifically illustrated in the accompanying FIGS. For example, the processes 116 within a given hierarchy can be capable of issuing requests to disconnect from services to which they are currently connected, which can affect the entries listed in the service maps 164 managed by the processes 116 within the hierarchy. Moreover, the processes 116 that implement services can issue service cancellation notifications that (i) cause all processes 116 subscribed to the services to be notified of the cancellation, and (ii) cause updates to the service maps 164 managed by the processes 116 to reflect that the services are no longer available. Additionally, service migration requests can be implemented to enable a service implemented by a first process 116 to be implemented by a second process 116 instead. Such migration requests can be issued, for example, in response to identifying that a service registration would otherwise cause a duplicate service to be implemented within the hierarchy. This approach can potentially mitigate issues when a process 116 insists that it function as the sole provider of a service within the hierarchy.

Figure 7:
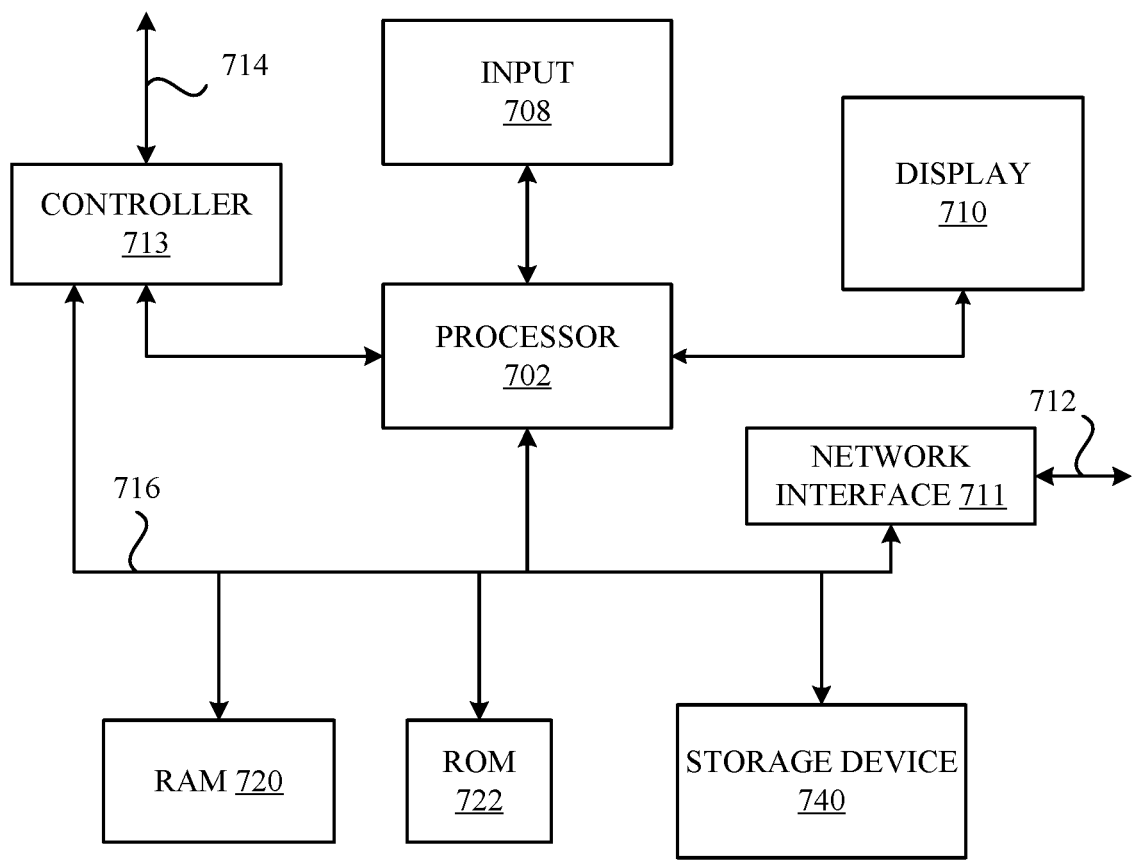
FIG. 7 illustrates a detailed view of a computing device that can be used to implement the various components described herein, according to some embodiments.

FIG. 7 illustrates a detailed view of a computing device 700 that can be used to implement the various components described herein, according to some embodiments. In particular, the detailed view illustrates various components that can be included in the computing device 102 illustrated in FIG. 1. As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to display information to the user. A data bus 716 can facilitate data transfer between at least a storage device 740, the processor 702, and a controller 713. The controller 713 can be used to interface with and control different equipment through and equipment control bus 714. The computing device 700 can also include a network/bus interface 711 that couples to a data link 712. In the case of a wireless connection, the network/bus interface 711 can include a wireless transceiver.

The computing device 700 also includes a storage device 740, which can comprise a single disk or a plurality of disks (e.g., SSDs), and includes a storage management module that manages one or more partitions within the storage device 740. In some embodiments, storage device 740 can include flash memory, semiconductor (solid state) memory or the like. The computing device 700 can also include a Random-Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. At least one non-transitory computer readable storage medium configured to store instructions that, when executed by at least one processor included in a computing device, cause the computing device to enable a first process executing within a web browser to access services provided by other processes executing within the web browser, by carrying out steps that include, at the first process:
   receiving, from a child process, a request to register a service;
   updating a service map associated with the first process to reflect that the service is accessible via the child process;
   determining whether the first process is associated with a parent process;
   in response to determining that the first process is associated with the parent process:
      issuing, to the parent process, a second request to register the service;
   receiving, from a process, a connection request directed to the service;
   identifying, based on the service map, that the service is accessible via the child process; and
   forwarding the connection request to the child process, wherein the child process provides the connection request to the service.

2. The at least one non-transitory computer readable storage medium of claim 1, further comprising:
   forwarding the connection request to the child process, wherein the child process directly or indirectly provides the connection request to the service;
   receiving, from the child process, a connection acknowledgement that corresponds to the connection request;
   forwarding the connection acknowledgement to the process;
   receiving, from the process, a message addressed to the service; and
   forwarding the message to the child process, wherein the child process directly or indirectly provides the message to the service.

3. The at least one non-transitory computer readable storage medium of claim 1, wherein the request to register the service includes:
   a name for the service; and
   a unique identifier (ID) for a process that implements the service.

4. The at least one non-transitory computer readable storage medium of claim 3, wherein the process that implements the service is:
   the child process itself, or
   an additional process that is a child to the child process.

5. The at least one non-transitory computer readable storage medium of claim 3, wherein the request to register the service further includes:
   a name for the child process.

6. The at least one non-transitory computer readable storage medium of claim 5, wherein updating the service map comprises:
   adding, to the service map, an entry that establishes an association between (1) the name for the child process, and (2) the name for the service and the unique ID for the child process.

7. The at least one non-transitory computer readable storage medium of claim 1, further comprising:
   identifying a condition to implement a second service at the first process;
   identifying whether the first process is associated with the parent process; and
   in response to identifying that the first process is associated with the parent process:
      issuing, to the parent process, a third request to register the second service.

8. A computing device configured to enable a first process executing within a web browser to access services provided by other processes executing within the web browser, the computing device comprising:
   at least one processor;
   and at least one memory storing instructions that, when executed by the at least one processor, cause the computing device to implement a first process executing within the web browser configured to:
      receiving, from a child process, a request to register a service;
      updating a service map associated with the first process to reflect that the service is accessible via the child process;
      determining whether the first process is associated with a parent process;
      in response to determining that the first process is associated with the parent process:
         issuing, to the parent process, a second request to register the service;
      receiving, from a process, a connection request directed to the service;
      identifying, based on the service map, that the service is accessible via the child process; and
   forwarding the connection request to the child process, wherein the child process provides the connection request to the service.

9. The computing device of claim 8, wherein the first process executing within the web browser is further configured to:
   forwarding the connection request to the child process, wherein the child process directly or indirectly provides the connection request to the service;
   receiving, from the child process, a connection acknowledgement that corresponds to the connection request;

forwarding the connection acknowledgement to the process;

receiving, from the process, a message addressed to the service; and forwarding the message to the child process, wherein the child process directly or indirectly provides the message to the service.

10. The computing device of claim 8, wherein the request to register the service includes:

a name for the service; and a unique identifier (ID) for a process that implements the service.

11. The computing device of claim 10, wherein the first process executing within the web browser is further configured to:

the child process itself, or an additional process that is a child to the child process.

12. The computing device of claim 8, wherein the request to register the service further includes:

a name for the child process.

13. The computing device of claim 8, wherein updating the service map comprises:

adding, to the service map, an entry that establishes an association between (1) the name for the child process, and (2) the name for the service and the unique ID for the child process.

14. The computing device of claim 8, wherein the first process executing within the web browser is further configured to:

identifying a condition to implement a second service at the first process;

identifying whether the first process is associated with the parent process; and in response to identifying that the first process is associated with the parent process:

issuing, to the parent process, a third request to register the second service.

15. A method for a first process executing within a web browser to access services provided by other processes executing within the web browser, the method comprising, at a first process executing within the web browser:

receiving, from a child process, a request to register a service;

updating a service map associated with the first process to reflect that the service is accessible via the child process;

determining whether the first process is associated with a parent process;

in response to determining that the first process is associated with the parent process:

issuing, to the parent process, a second request to register the service;

receiving, from a process, a connection request directed to the service;

identifying, based on the service map, that the service is accessible via the child process; and forwarding the connection request to the child process, wherein the child process provides the connection request to the service.

16. The method of claim 15, further comprising:

forwarding the connection request to the child process, wherein the child process directly or indirectly provides the connection request to the service;

receiving, from the child process, a connection acknowledgement that corresponds to the connection request;

forwarding the connection acknowledgement to the process;

receiving, from the process, a message addressed to the service; and forwarding the message to the child process, wherein the child process directly or indirectly provides the message to the service.

17. The method of claim 15, further comprising:

a name for the service; and a unique identifier (ID) for a process that implements the service.

18. The method of claim 15, wherein the request to register the service includes:

the child process itself, or an additional process that is a child to the child process.

19. The method of claim 15, wherein the request to register the service further includes:

a name for the child process.

20. The method of claim 15, wherein updating the service map comprises:

adding, to the service map, an entry that establishes an association between (1) the name for the child process, and (2) the name for the service and the unique ID for the child process.

21. The method of claim 15, further comprising:

identifying a condition to implement a second service at the first process;

identifying whether the first process is associated with the parent process; and in response to identifying that the first process is associated with the parent process:

issuing, to the parent process, a third request to register the second service.

* * * * *